US012625875B2

(12) United States Patent
Setlur et al.

(10) Patent No.: US 12,625,875 B2
(45) Date of Patent: May 12, 2026

(54) SEMANTIC SEARCH INTERFACE FOR DATA REPOSITORIES

(71) Applicant: Salesforce, Inc., San Francisco, CA (US)

(72) Inventors: Vidya Raghavan Setlur, Portola Valley, CA (US); Arjun Srinivasan, Seattle, WA (US); Andriy Kanyuka, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/427,799

(22) Filed: Jan. 30, 2024

(65) Prior Publication Data

US 2024/0338378 A1 Oct. 10, 2024

Related U.S. Application Data

(60) Provisional application No. 63/461,237, filed on Apr. 21, 2023, provisional application No. 63/457,367, filed on Apr. 5, 2023.

(51) Int. Cl.
*G06F 16/00* (2019.01)
*G06F 16/242* (2019.01)
(Continued)

(52) U.S. Cl.
CPC .......... *G06F 16/248* (2019.01); *G06F 16/243* (2019.01); *G06F 16/24578* (2019.01); *G06F 16/256* (2019.01)

(58) Field of Classification Search
CPC .... G06F 16/248; G06F 16/243; G06F 16/256; G06F 16/24578
(Continued)

(56) References Cited

U.S. PATENT DOCUMENTS

| | | | | |
|---|---|---|---|---|
| 11,314,786 B1 * | 4/2022 | Setlur | .................... | G06T 11/206 |
| 2021/0349950 A1 * | 11/2021 | Setlur | ..................... | G06F 40/30 |
| 2022/0405314 A1 | 12/2022 | Du et al. | | |

OTHER PUBLICATIONS

"Requirements Dependency Graph Modeling on Software Requirements Specification Using Text Analysis"; By: Yudi Priyadi, Published Aug. 2019 https://ieeexplore.ieee.org/stamp/stamp.jsp?tp=&arnumber=8874920 (Year: 2019).*
(Continued)

*Primary Examiner* — Chelcie L Daye
(74) *Attorney, Agent, or Firm* — Morgan, Lewis & Bockius LLP

(57) ABSTRACT
A method provides visual analysis of datasets. A system receives a natural language search query that is directed to data repositories including data sources and data visualizations. The system parses search tokens to determine if the natural language search query contains analytic intents. The system also determines if the search tokens match fields in one or more data sources, using a semantic search. When (i) the search tokens match fields in the one or more data sources and (ii) the natural language search query contains analytic intents, the system generates and displays visualization responses. When (i) the search tokens do not match fields in the data sources or (ii) the natural language search query does not contain the analytic intents, the system displays pre-authored content from the data visualizations.

19 Claims, 27 Drawing Sheets

(51) Int. Cl.
*G06F 16/2457* (2019.01)
*G06F 16/248* (2019.01)
*G06F 16/25* (2019.01)

(58) Field of Classification Search
USPC ........................................................ 707/730
See application file for complete search history.

(56) References Cited

OTHER PUBLICATIONS

"Requirements Dependency Graph Modeling on Software Requirements Specifications Using Text Analysis"; By: Yudi Priyadi https://ieeexplore.ieee.org/stamp/stamp.jsp?tp=&arnumber=8874920 (Year: 2019).*
Salesforce, Inc., International Search Report and Written Opinion, PCT/US2024/023443, Jun. 8, 2024, 11 pgs.
Vidya Setlur et al., "Olio: A Semantic Search Interface for Data Repositories," arXiv:2307.116396v1, Jul. 31, 2023, UIST'23, San Francisco, CA, USA, 16 pgs.

* cited by examiner

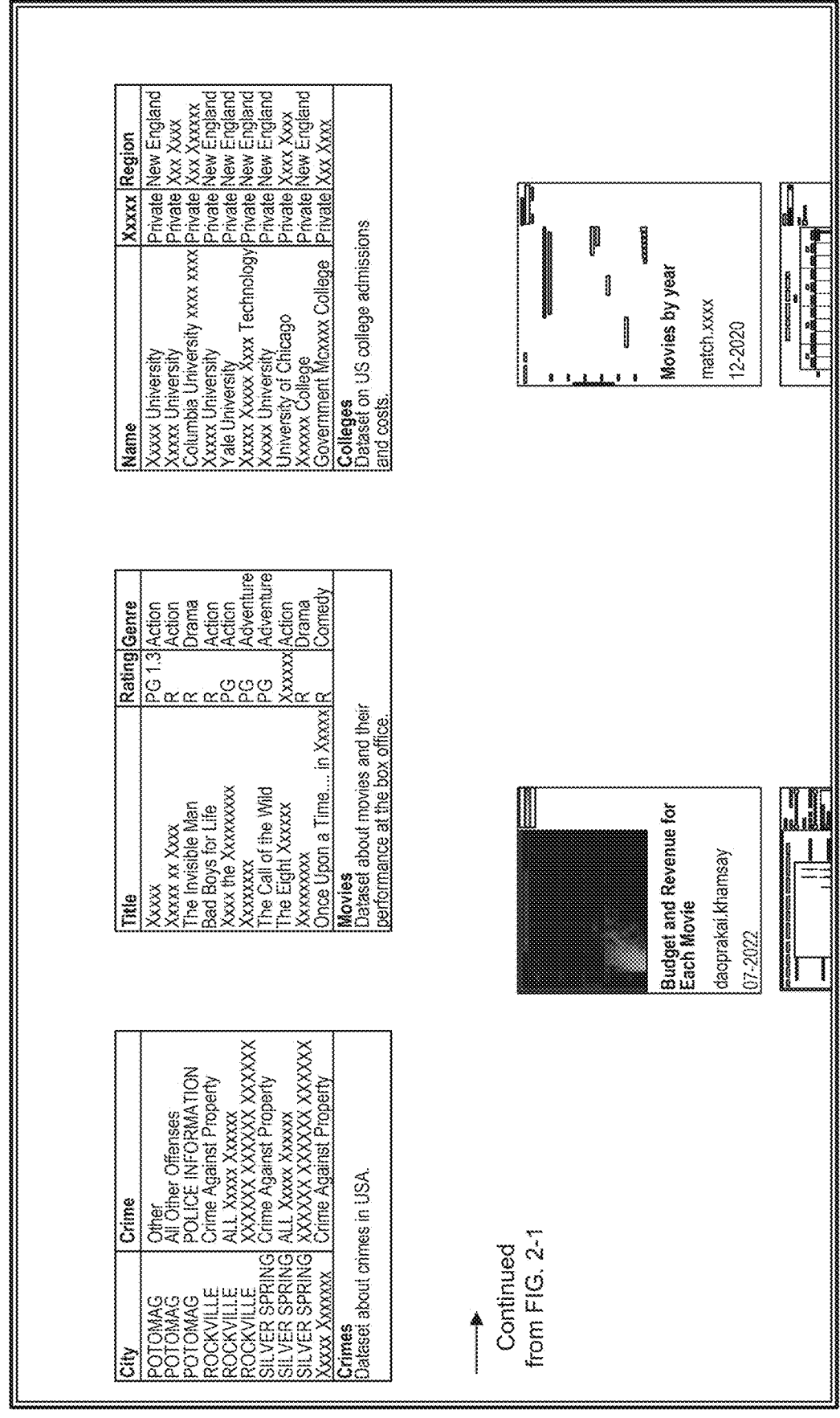

| City | Crime |
|---|---|
| POTOMAG | Other |
| POTOMAG | All Other Offenses |
| POTOMAG | POLICE INFORMATION |
| ROCKVILLE | Crime Against Property |
| ROCKVILLE | ALL Xxxxx Xxxxxx |
| ROCKVILLE | XXXXXX XXXXXX XXXXXX XXXXXX |
| SILVER SPRING | Crime Against Property |
| SILVER SPRING | ALL Xxxxx Xxxxxx |
| SILVER SPRING | XXXXXX XXXXXX XXXXXX |
| Xxxxx Xxxxxxx | Crime Against Property |

Crimes
Dataset about crimes in USA.

| Title | Rating | Genre |
|---|---|---|
| Xxxxx | PG 1,3 | Action |
| Xxxxx xx Xxxx | R | Action |
| The Invisible Man | R | Drama |
| Bad Boys for Life | R | Action |
| Xxxx the Xxxxxxxxx | PG | Action |
| Xxxxxxxx | PG | Adventure |
| The Call of the Wild | PG | Adventure |
| The Eight Xxxxxx | Xxxxxx | Action |
| Xxxxxxxxx | R | Drama |
| Once Upon a Time.... in Xxxxxx | R | Comedy |

Movies
Dataset about movies and their performance at the box office.

| Name | Xxxxx | Region |
|---|---|---|
| Xxxxx University | Private | New England |
| Xxxxx University | Private | Xxx Xxxx |
| Columbia University xxxx xxxx | Private | Xxx Xxxxxx |
| Xxxxx University | Private | New England |
| Yale University | Private | New England |
| Xxxxx Xxxxx Xxxx Technology | Private | New England |
| Xxxxx University | Private | New England |
| University of Chicago | Private | Xxxx Xxxx |
| Xxxxxx College | Private | New England |
| Government Mcxxxx College | Private | Xxx Xxxx |

Colleges
Dataset on US college admissions and costs.

Budget and Revenue for Each Movie
dacprakai.khamsay
07-2022

Movies by year
match.xxxx
12-2020

FIG. 2-2

```
"vizTypes": {
  "concepts": [
    "bar chart, bar group, bar graph, column chart, column graph",
    "line chart, line graph, timeline, trend, time series",
    "area chart, area graph",
    "scatterplot, correlation",
    "bubble chart, bubble graph, packed bubbles",
    "text table, tabular view, list, table",
    "heatmap, highlight table",
    "histogram, distribution",
    "radial chart",
    "sunburst chart",
    "waterfall chart",
    "slope chart, slope graph",
    "sankey, sankey chart, sankey diagram, sankey plot",
    "gantt chart"
```

Continued from

| Name | Sex | Age | Height | Weight | Country | City | Crime | Place | Price | Type | highest | Xxxx | Xxxxx | Xxx | xxxx | Xxx | xxx |
|---|---|---|---|---|---|---|---|---|---|---|---|---|---|---|---|---|---|
| Xxxxxx Xxxxxx | M | 21 | 198 | 90 | Italy | POTOMAG | Other | Street + R | 977 | apartment | xxx | xxx | 1 | 1.0 | | 0 | |
| Xxxx Xxxxxx Xxxx Xxxx | F | 22 | 178 | 82 | Russia | POTOMAG | All Other Offenses | Street + R | 1309 | apartment | xxx | xxx | 1 | 1.0 | | 0 | |
| Xxxxxx Xxxxxx | M | 24 | 145 | 55 | United States | POTOMAG | POLICE INFORMATION | Street + R | 1448 | apartment | xxx | xxx | 2 | 1.0 | | 0 | |
| Xxxxxx Xxxxxx | F | 20 | 175 | 56 | United States | ROCKVILLE | Crime Against Property | Consumer | 860 | xxxxxxxxx | xxxx | xxx | 2 | 2.5 | | 0 | |
| Xxxxxx Xxxxxx | M | 18 | 156 | 62 | Russia | ROCKVILLE | ALL Xxxxx Xxxxxx | Consumer | 800 | apartment | xxx | xxx | 1 | 1.0 | | 0 | |
| Xxxxxx Xxxxxx | M | 19 | 141 | 62 | Russia | ROCKVILLE | XXXXXX XXXXXX XXXXXX | Consumer | 820 | apartment | xxxx | xxx | 2 | 2.0 | | 0 | |
| Xxxxxx Xxxxxx | M | 24 | 141 | 62 | Russia | SILVER SPRING | Crime Against Property | Residence | 800 | apartment | xxxx | xxxx | 2 | 2.0 | | 0 | |
| Xxxxxx Xxxxxx | M | 24 | 161 | 62 | Russia | SILVER SPRING | ALL Xxxxx Xxxxxx | Residence | 1500 | xxxxx | xxxx | xxxx | 2 | 2.0 | | 0 | |
| Xxxxxx Xxxxxx | M | 24 | 141 | 62 | Russia | SILVER SPRING | XXXXXX XXXXXX XXXXXX | Residence | 1130 | apartment | xxxx | xxx | 2 | 2.0 | | 0 | |
| Xxxxx Xxxxxxx | M | 30 | 197 | 50 | Australia | Xxxxx Xxxxxxx | Crime Against Property | Residence | 675 | xxxxxxxxx | xxx | xxx | 1 | 1.0 | | 0 | |

Olympics
Dataset about Olympics medal winners.

Crimes
Dataset about crimes in USA.

Housing
Dataset about housing prices.

Continued from FIG. 12A-1

Hospitalized Covid Trend
Charles.dennis
04-2020

Sheet 1
dominik.so.owiej
05-2022

Budget and Revenue for Each Movie
daoprakai.khamsay
07-2022

FIG. 12A-2

SEMANTIC SEARCH INTERFACE FOR DATA REPOSITORIES

RELATED APPLICATIONS

This application claims priority to U.S. Provisional Application Ser. No. 63/457,367, filed Apr. 5, 2023, entitled "Semantic Search Interface for Data Repositories," which is incorporated by reference herein in its entirety.

This application claims priority to U.S. Provisional Application Ser. No. 63/461,237, filed Apr. 21, 2023, entitled "Semantic Search Interface for Data Repositories," which is incorporated by reference herein in its entirety.

TECHNICAL FIELD

The disclosed implementations relate generally to data visualizations, and more specifically to systems, methods, and user interfaces for semantic search of data repositories.

BACKGROUND

User expectations of search interfaces are evolving. Search engines are increasingly expected to answer questions along with providing contextually relevant content that help address a searcher's goal. Current keyword-based search methods are mostly designed for content retrieval. Their main underlying drawback is limited support for structured query types that generally expect focused and specific responses. Natural language (NL) question and answering (Q&A) interfaces, on the other hand, support more fact-finding inquiry but do not support content or document discovery and retrieval.

With an increase in the number of data repositories on the web, including structured data in the form of relational databases, files, and knowledge graphs, there is a plethora of information that supports the blend of generating responses to fact-finding questions with document retrieval. Along similar lines, data repositories and visualization tools host hundreds or thousands of visualizations representing a wide range of datasets, making them rich platforms for knowledge sharing and consumption. Search plays a pivotal role in these repositories, providing people the ability to winnow in on content they are interested in (e.g., charts on a specific topic, charts showing data trends and bespoke visualizations such as Sankey diagrams, or charts authored by a particular person). Current search systems tend to rely on document-retrieval techniques to provide relevant search results for a given query. However, the challenge with data repositories lies in the sparseness of searchable text within them; data sources and charts often have limited text information in the form of titles, captions, and textual data values, for example. There is a need to explore alternative ways to index and search for content based on this limited availability of textual information.

Another challenge is that current search features for data repositories offer limited expressivity in specifying search queries, restricting users to predominantly perform keyword search for content based on the visualizations' titles and authors. In contrast, other contemporary search interfaces, such as general web search, image and video search, and social networking sites enable users to find and discover content through a rich combination of textual content (e.g., keywords or topics covered in a website), visual features within the content (e.g., looking for images with a specific background color), dates (e.g., viewing videos from the recent week), geographic locations (e.g., limiting search to zip codes or cities), and even different types of media (e.g., searching for similar images through reverse image search).

Designing expressive search interfaces for data repositories requires gaining a deeper empirical understanding of people's search requirements, given the current limitations of these systems. For instance, what goals do people have in mind when using search in the context of data repositories? How do people formulate their search queries? Is text alone a sufficient modality for search? If not, what are complementary/alternative modalities? What supporting metadata do people want to query for or use to filter the search results?

SUMMARY

Accordingly, there is a need for systems, methods and interfaces for semantic search of data repositories. Some implementations bridge the gap between two contrasting search paradigms-keyword-based search methods and natural language (NL) question and answering (Q&A) interfaces-based on a hybrid methodology called semantic search. Semantic search applies user intent and the meaning (e.g., semantics) of words and phrases to determine the right content that might not be present immediately in the text (the keywords themselves) but is closely tied to what the searcher wants. The information retrieval technique goes beyond simple keyword matching by using information, such as entity recognition, word disambiguation, and relationship extraction to interpret the searcher's intent in the queries. For example, keyword search can find documents with the query, "French press", while queries such as "How do I quickly make strong coffee?" or "manual coffee brewing methods" are better served by semantic search to produce targeted responses.

Some implementations provide hybrid search capabilities for data repositories that contain curated data sources and visualization content. Some implementations provide a search interface that provides a hybrid set of results comprising both auto-generated visualization responses and pre-authored charts to blend analytical question-answering with content discovery search goals. Some implementations support three search scenarios-question-and-answering, exploratory search, and design search over data repositories. The interface also provides faceted search support for users to refine and filter the conventional best-first search results based on parameters such as author name, time, and chart type. A preliminary user evaluation of the system demonstrates that the interfaces and the hybrid search described herein collectively afford greater expressivity in how users discover insights and visualization content in data repositories.

According to some implementations, a method is provided for visual analysis of datasets. The method is performed at a computing system having one or more processors and memory storing one or more programs configured for execution by the one or more processors. The method includes receiving a natural language search query that is directed to a plurality of data repositories comprising a plurality of data sources and one or more data visualizations. The method also includes parsing search tokens corresponding to the natural language search query to determine if the natural language search query contains one or more analytic intents. The method also includes determining if the search tokens match fields in one or more data sources of the plurality of data sources, using a semantic search. The method also includes generating and displaying one or more visualization responses when (i) the search tokens match fields in the one or more data sources and (ii) the natural language search query contains one or more analytic intents. The method also includes displaying a pre-authored content from the one or more data visualizations when (i) the search tokens does not match fields in the plurality of data sources or (ii) the natural language search query does not contain the one or more analytic intents.

In some implementations, the method further includes obtaining the search tokens using a federated query search that distributes a query to multiple search repositories and combines results into a single, consolidated search result.

In some implementations, the one or more analytic intents are one or more of: grouping, aggregation, correlation, filter and limits, temporal, and geospatial.

In some implementations, parsing the search tokens further comprises identifying data attributes and values along with the one or more analytic intents based on the plurality of data sources and metadata of the plurality of data sources.

In some implementations, identifying data attributes and values comprises comparing N-grams corresponding to the search tokens to available data attributes for syntactic similarities and semantic similarities.

In some implementations, the syntactic similarities are identified using Levenshtein distance and the semantic similarities are identified using Wu-Palmer similarity scores.

In some implementations, the semantic search includes indexing each of the plurality of data repositories and corresponding metadata to obtain indices, and performing a federated search to determine if the search tokens match fields in the one or more data sources of the plurality of data sources, based on the indices.

In some implementations, the indexing includes, for each data repository and visualization context with associated metadata, representing each file as a respective document vector, and storing N-gram string tokens from the document vectors to support partial and exact matches.

In some implementations, performing the federated search includes obtaining a query vector corresponding to the search tokens, encoding the query vector into query string tokens using an encoder that was used to generate the indices, and selecting a predetermined number of candidate document vectors from document vectors for each data repository and visualization context with associated metadata, based on an amount of overlap between the query string tokens and document string tokens for the document vectors.

In some implementations, the method further includes ranking the predetermined number of candidate document vectors using a scoring function that scores documents based on the search tokens appearing in each document, regardless of their proximity within the document.

In some implementations, the method further includes generating and displaying the one or more visualization responses by interpreting the one or more analytic intents based on a list of a predetermined number of data sources returned by the semantic search.

In some implementations, the method further includes generating and displaying the one or more visualization responses based on attributes, values, and the analytical intent in the natural language search query.

In some implementations, the method further includes, in accordance with a determination that the semantic search returns a plurality of data sources, providing a drop-down list of data source alternatives along with a respective corresponding percentage match score for each data source.

In some implementations, the method further includes displaying suggested queries for the data source when (i) the semantic search returns a matching data source for the natural language query and (ii) the search tokens do not resolve to valid attributes and values within the data source.

In some implementations, the method further includes generating the suggested queries using a template-based approach based on a combination of attributes from the data source and data interestingness metrics.

In some implementations, the method further includes generating and displaying the one or more visualization responses using three encoding channels (x, y, color) and four mark types (bar, line, point and geo-shape), thereby supporting dynamic generation of bar charts, line charts, scatterplots, and maps that cover a range of analytic intents.

In some implementations, the method further includes determining mark types of the one or more visualization responses based on mappings between visual encodings and attribute data types.

In some implementations, the method further includes generating and displaying a dynamic text summary describing the one or more visualization responses using one or more statistical computations and a large language model.

In some implementations, the method further includes providing, to the large language model, a prompt containing a statistical description that is extracted from the generated visualization using a predefined set of heuristics, and in response to providing the prompt, receiving the dynamic text summary from the large language model.

In some implementations, the predefined set of heuristics is selected according to the type of the generated visualization.

In some implementations, the prompt corresponds to (i) minimum/maximum and average values for a bar chart, and (ii) the Pearson's correlation coefficient for scatterplots.

In another aspect, a method is provided for visual analysis of datasets. The method is performed at a computing system having one or more processors and memory storing one or more programs configured for execution by the one or more processors. The method includes receiving user selection of a data source, presenting a graphical user interface for analysis of data in the selected data source, and providing three search options. The search options include a question-and-answer search for interpreting analytical intent over a set of curated data sources, an exploratory search for document-based information retrieval on indexed visualization content, and a design search that uses visualization metadata for the data source.

In some implementations, the method further includes providing a facet-driven browser to prune search results by author name, time range, and/or visualization type.

In some implementations, the method further includes providing a landing screen that displays a sampling of data sources as thumbnail images, and in response to hovering over a thumbnail image for a data source, displaying metadata information corresponding to the data source.

In some implementations, the method further includes, in response to a user typing a search query in an input text box: using tokens of the search query as keywords to match any pre-authored visualizations, and displaying a grid of thumbnails as a preview for browsing and exploration. Each thumbnail is hyperlinked to its corresponding visualization file that can be selected to peruse in more detail or downloaded.

In some implementations, title, author name, and creation date of a visualization are displayed below each thumbnail to provide additional context.

In some implementations, the method further includes, in response to detecting a token in the search query that is a geographic location, generating a map as a response to the search query.

In some implementations, the method further includes displaying scented widgets on a portion of an exploratory search panel to support faceted browsing of the pre-authored visualizations.

In some implementations, the method further includes augmenting data sources with metadata and semantics, prior to receiving a search query, including linking attributes and values in the data sources to ontological concepts, including synonyms and related terms.

In some implementations, the metadata comprises data types and attribute semantics, including identification of attributes that are measures and dimensions.

In another aspect, an electronic device includes one or more processors, memory, a display, and one or more programs stored in the memory. The programs are configured for execution by the one or more processors and are configured to perform any of the methods described herein.

In another aspect, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow users to perform visual analysis of datasets.

Both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 5 shows an example JSON list of visualization types and their concepts that are stored as metadata to support design search, according to some implementations.

FIGS. 10-1 and 10-2 collectively show an example interface displaying a sample of available data sources and pre-authored visualizations indexed from a database, according to some implementations.

FIGS. 12A-1 and 12A-2 collectively show an example search interface, according to some implementations.

FIGS. 12B-1 and 12B-2 collectively show the example search interface of FIGS. 12A-1 and 12A-2 with a preview of metadata, according to some implementations.

FIG. 16 is a block diagram illustrating a computing device, which can display the graphical user interfaces and support visual analysis of datasets, in accordance with some implementations.

FIG. 17 shows a flowchart of an example method for visual analysis of datasets, according to some implementations.

FIG. 18 shows a flowchart of another example method for visual analysis of datasets, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

According to some implementations, an interface supports semantic search behavior by dynamically generating visualization responses and pre-authored visualizations for data repositories. Specifically, the interface implements three search scenarios on a semantic search framework: Q&A search by interpreting analytical intent over a set of curated data sources, exploratory search using document-based information retrieval methods on existing indexed visualization content, and design search by leveraging visualization metadata for the content. The interface also supports facet-driven browsing to prune the search results by author name, time range, and/or visualization type.

A qualitative study was performed to gain feedback on the implemented metadata and querying features, to identify system design and implementation challenges, and to better understand user behavior. The study confirmed that the semantic search paradigm supports the different data repository search goals. The ability to perform both Q&A and search for pre-authored content facilitated a fluid analytic search experience.

As used herein, a "data repository" typically refers to a repository of data visualization, including metadata and parameters for data visualizations.

Example Search Scenarios

Figure 1A:
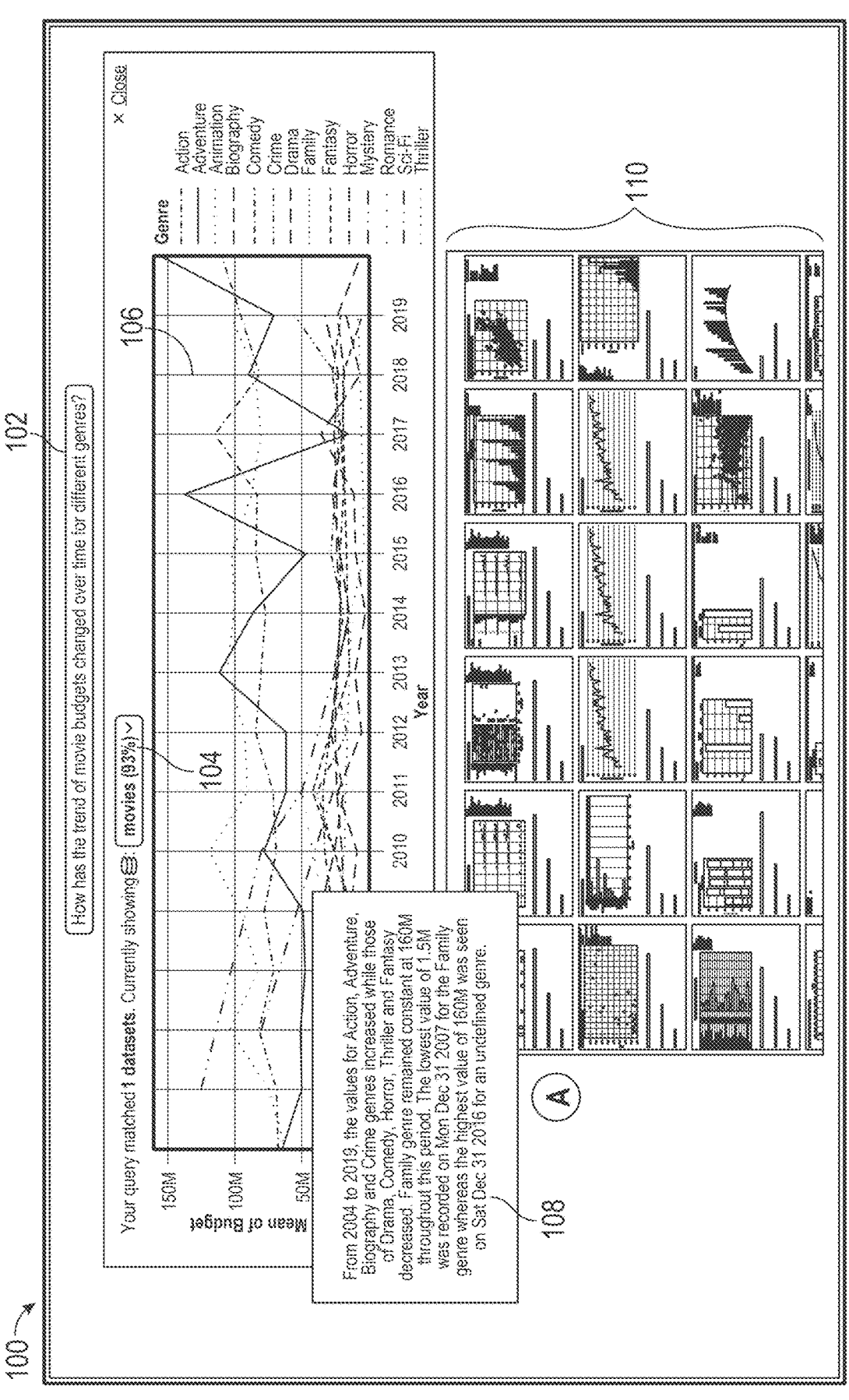
FIG. 1A shows an example search scenario for Question and Answer (Q&A), for an input query, according to some implementations.
Figure 1B:
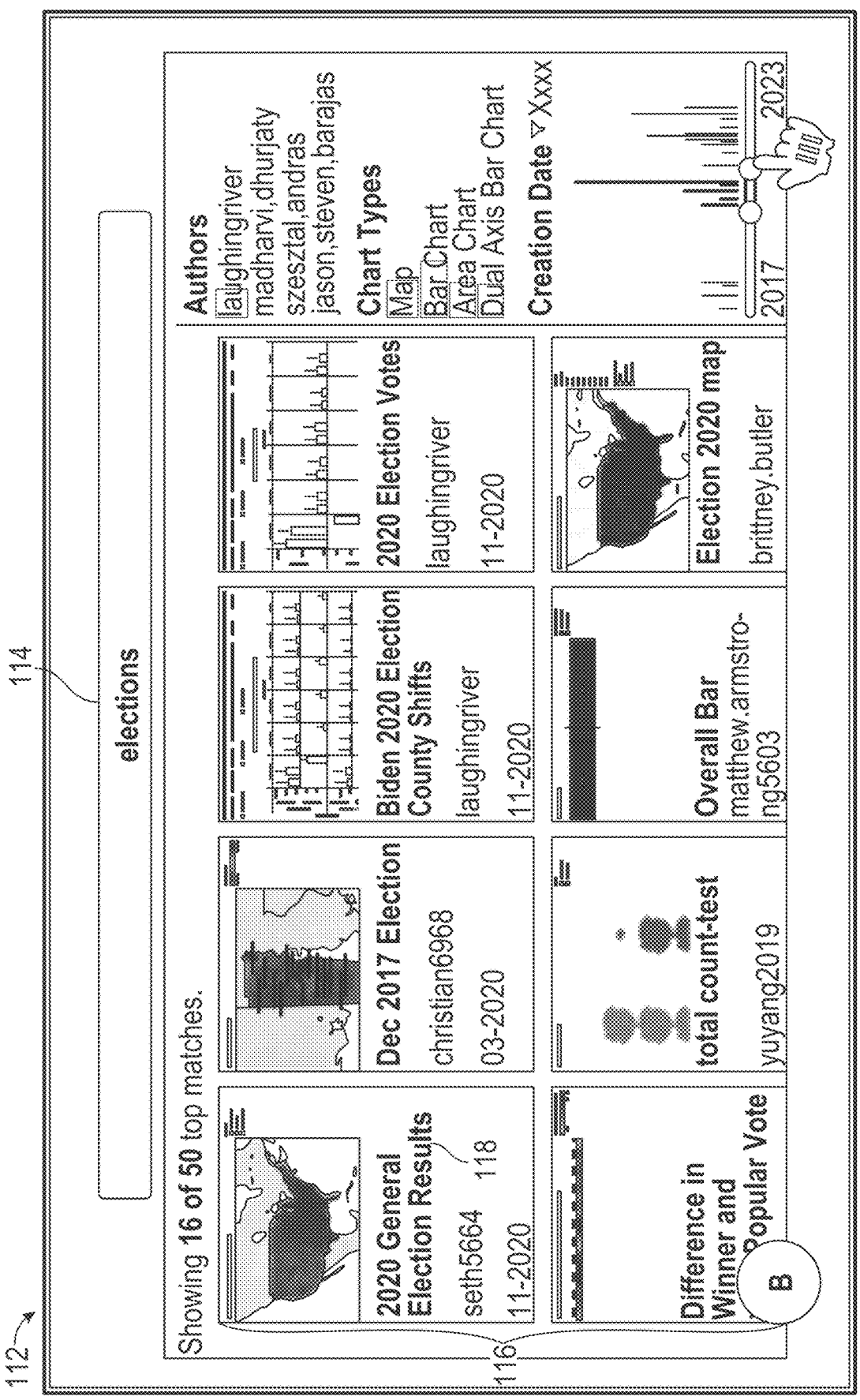
FIG. 1B shows an example search scenario for exploratory search, according to some implementations.
Figure 1C:
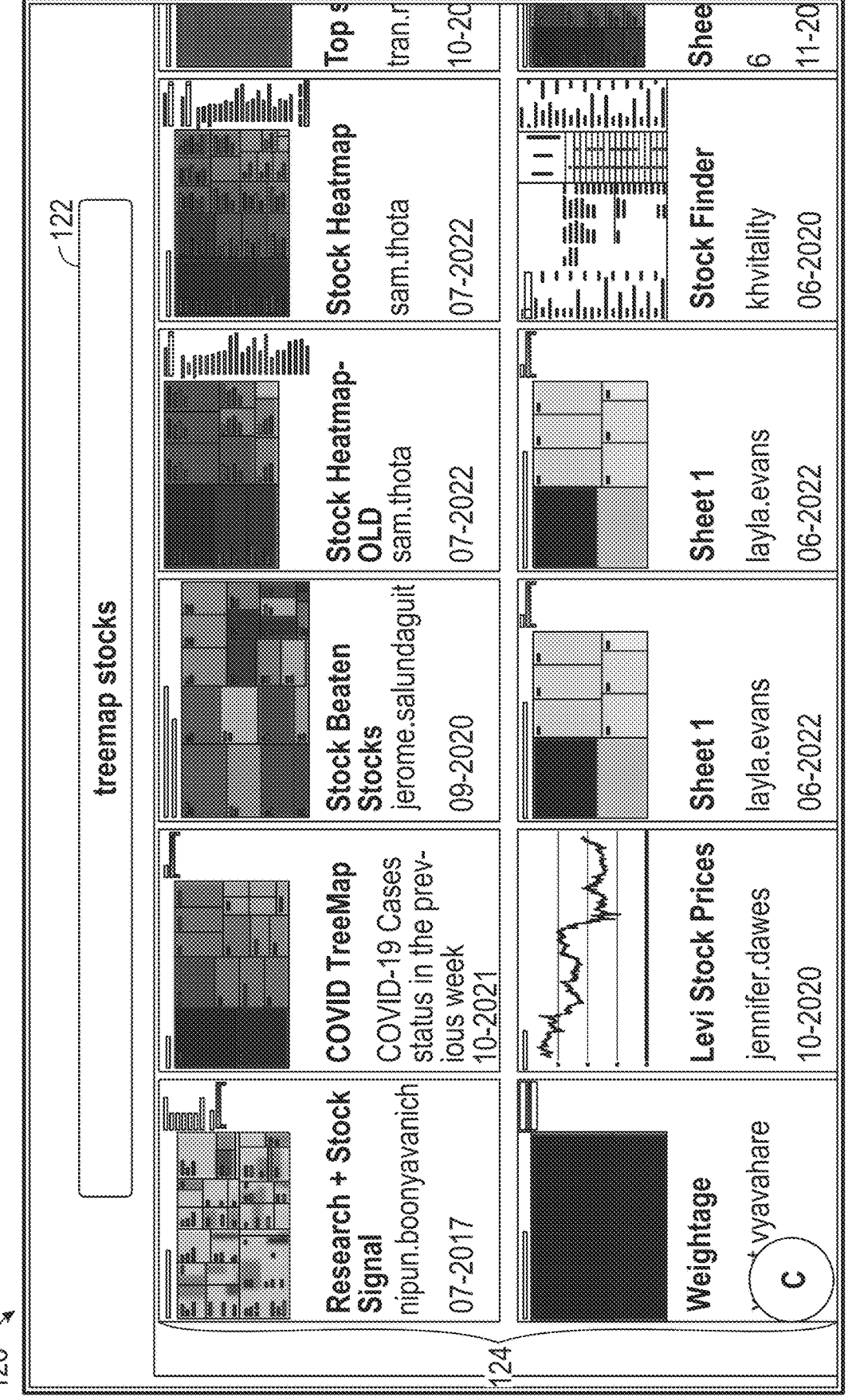
FIG. 1C shows an example search scenario for design search, according to some implementations.

FIGS. 1A-1C show example semantic search scenarios, according to some implementations. FIG. 1A shows an example search scenario 100 for Question and Answer (Q&A), for an input query 102 "How has the trend of movie budgets changed over time for different genres?". Some implementations detect that it is a Q&A search with an analytical intent, 'trend.' A curated data source 104 ('movies') is a top-scored match to the query, and the system generates a multivariate line chart response 106. A generated text summary 108 describes the visualization as shown. Pre-authored visualization content 110 is also displayed as thumbnails below the generated response as additional information.

FIG. 1B shows an example search scenario 112 for exploratory search. Some implementations identify the input query 114 ("elections") as a keyword search query and shows pre-authored visualizations 116 with text content 118 pertaining to 'elections.'

FIG. 1C shows an example search scenario 120 for design search. A query 122 ("treemap stocks") is identified as a search of all content containing tree-map visualizations pertaining to 'stocks.' Some implementations return a set of relevant pre-authored visualizations 124 for the query and displays them as thumbnails. The thumbnails are linked to the actual visualizations if the user desires to continue with the analytical workflow.

Typically, there are three scenarios for search in the context of data repositories:

Question Answering (Q&A). Those who work with organization-specific repositories hosting several data sources often search to answer analytic questions. This goal is similar to information lookup in the broader web search context where user queries map to brief and discrete pieces of information (e.g., entities, dates, or computed values). However, with data repositories, participants issue analytic questions (e.g., "What are sales trends across regions?", "highest covid cases by country") and get an appropriate response containing visualization and/or text generated from the available data sources.

Exploratory Search. In line with the notion of exploratory search in web search, users leverage data repositories to learn about a topic through available charts and data. Examples of exploratory search queries include "NFL drafts", "USA covid trends", or "Fifa world cup." Such queries are typically open-ended and do not provide refined filtering criteria beyond the topic itself. For instance, a user (e.g., a visualization consultant) may refer to exploratory search as one of his prominent goals during the initial stages of customer interactions. This is similar to searching for visualizations on private equity dashboards at an investment firm. As another example, a visualization designer may use exploratory search to look for examples created by other users and for data sources about a topic.

Design Search. The ability to find visualizations based on design features (e.g., chart type or color) is another use case for search, especially among designers/consultants or novice visualization authors. Design search query examples include "sunburst chart," "bar and line combination chart," or "map with icons." This type of search is typically performed when users are looking for learning resources. For example, a developer may look for examples of force-directed layouts. Users may try to create a bespoke visualization like a Sankey diagram or users may try to understand design practices and find inspiration for their own work (e.g., using searches like "maps with a dark background" to find examples of charts with specific color constraints).

Note that these scenarios are neither exhaustive nor mutually exclusive. For instance, queries like "sales by state and segment as a heatmap" or "maps showing covid trends," combine Q&A and design search, and design and exploratory search, respectively.

Rather than being a definitive and ordered set, the three scenarios described above are primarily intended to serve as examples for broad categories of user tasks for designing search systems for data repositories.

In addition to defining search categories based on when and why people use search in data repositories (i.e., the above scenarios), the search system described herein identifies what information people find most relevant while searching and browsing visualizations. To this end, some implementations provide a list of curated meta-data fields. These fields may include visualization title and description, chart type (e.g., 'bar chart,' 'map,' 'heatmap'), graphical encodings, such as mark type, the visualization author, and/or a chart's creation date.

Example Designs

Some implementations provide a unified experience that supports all three search scenarios. Some implementations provide the same interface and modality to perform the different tasks. Some implementations provide a seamless experience that supports a common input modality (NL) and blended Q&A (a task commonly performed on data source collections) with exploratory and design search (tasks commonly performed with pre-authored visualization repositories).

Some implementations support linguistic variations in queries. Both prior work on NLIs for visualization and web search have shown that people use a variety of phrasings in search queries to accomplish the same goal. Users tend to use linguistically varied examples while discussing the same goal (e.g., "What are sales trends across regions?" vs. "sales by region over time"). Some implementations support a variety of query formats-terse keywords as well as queries phrased as questions or sentence fragments, with an understanding of analytical intent relevant to data repositories in either case.

Some implementations show textual responses and provide guidance for Q&A queries. Some implementations provide different types of visualizations for different queries. For example, besides charts, some implementations provide a text response to a text query, including complementary text along with a generated chart. Given a Q&A query, some implementations select an appropriate data source and generate a chart, in addition to generating text content that leverages the chart to help answer the input query. Furthermore, since Q&A queries can map to multiple data sources and users may not be aware of the available data source and fields, some implementations guide users to ask questions (e.g., via query suggestions) and provide metadata information on the relevant data sources (e.g., available data fields and data values to query).

Some implementations provide visual summaries and filtering options for search results. Conventional visualization search systems do not provide an easy way to comprehend and sift through results beyond manual inspection. To overcome this limitation, some implementations provide visual summaries and support dynamic filtering to help people get an overview, organize, and create meaningful facets of the visualization search results.

Example Interfaces

Some implementations provide an interface that supports semantic search behavior by dynamically generating visualization responses and pre-authored visualizations from data repositories. An example interface is described through a brief usage scenario. This is followed by details of example system components and implementation.

Figures 1, 2:
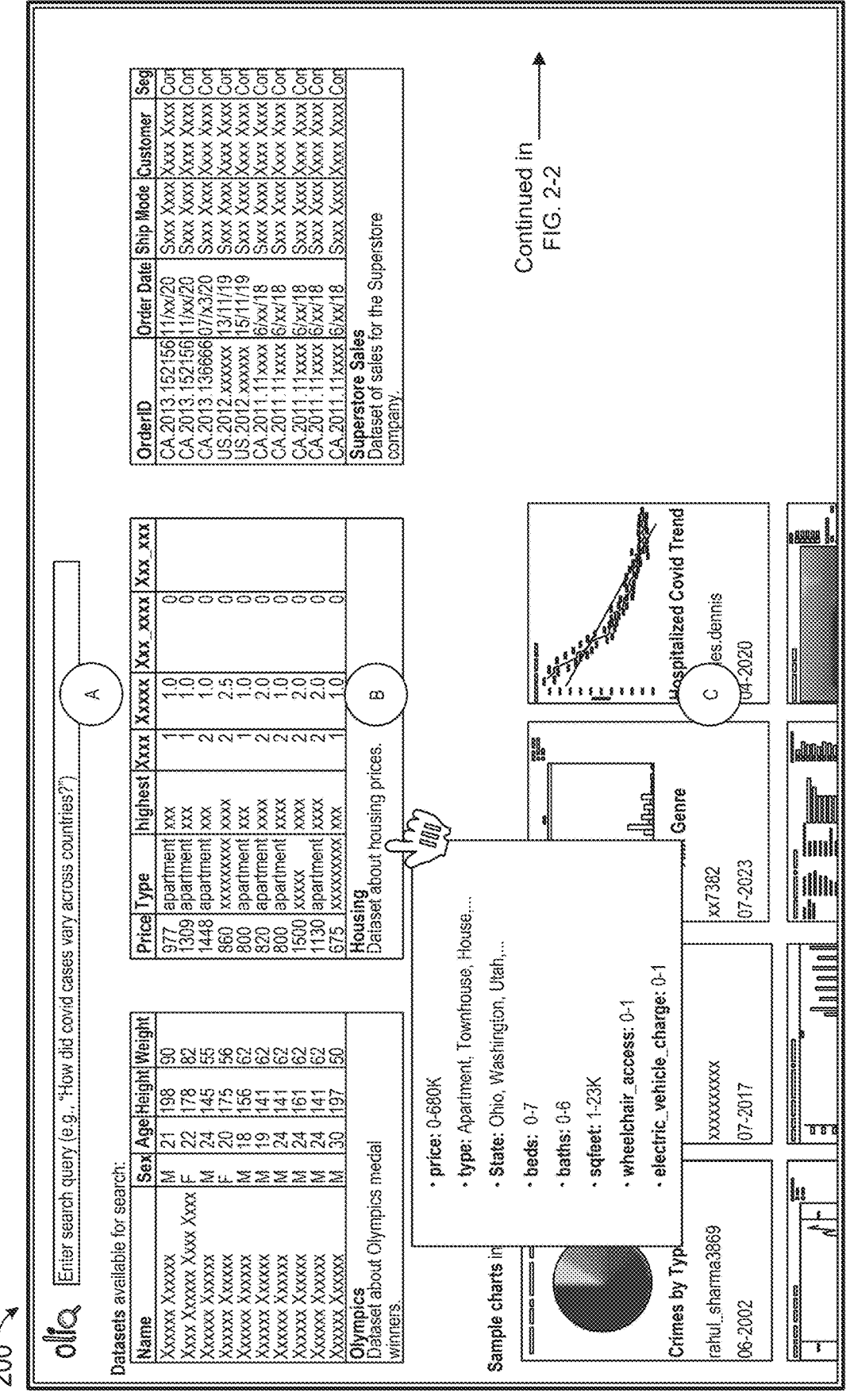
FIGS. 2-1 and 2-2 collectively show an example landing screen, according to some implementations.

FIGS. 2-1 and 2-2 collectively show an example landing screen 200, according to some implementations. The landing page shows a search input box (labeled 'A') with a placeholder query suggestion generated based on one of the available data sources. Thumbnail previews (labeled 'B') of some available data sources are shown. In some implementations, hovering over a data source (e.g., the 'Housing' data source) shows a tooltip displaying metadata about the data source's attributes and values. A sampling of pre-authored visualizations (labeled 'C') available for search is also shown, according to some implementations.

Figure 3:
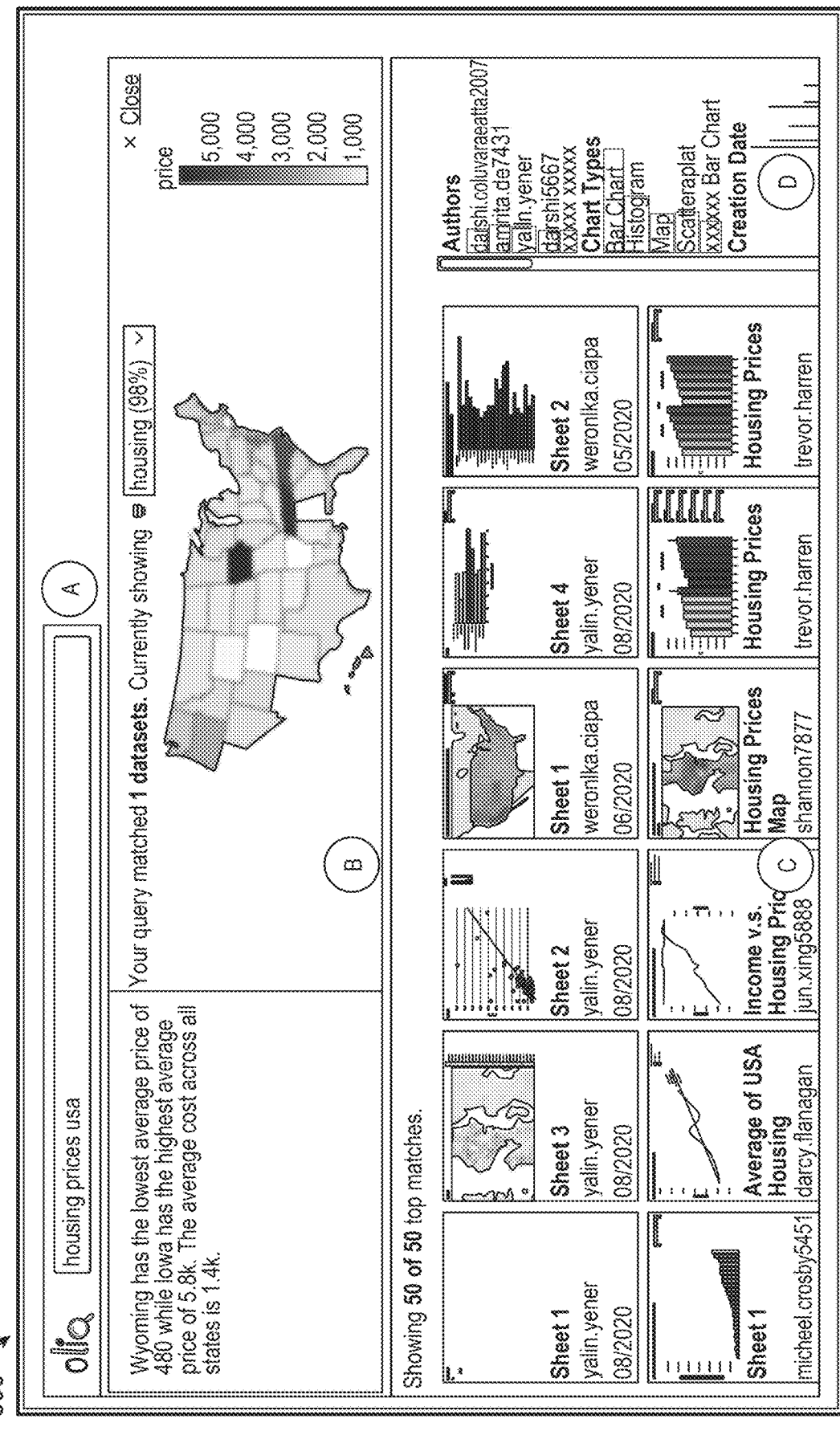
FIG. 3 shows an example search interface, according to some implementations.

In some implementations, the interface initially shows a landing screen that displays a sampling of data sets available for Q&A search. A user can hover over a data source thumbnail and view its corresponding metadata information. FIG. 3 shows an example search interface 300, according to some implementations. Some implementations show a search input box (labeled 'A'). Some implementations shows dynamically generated content (labeled 'B'), including a chart on the right and text highlighting the key takeaway messages from the chart on the left. Users can hover the mouse cursor over an icon to display a dataset summary tooltip similar to the one shown in FIGS. 2-1 and 2-2. Some implementations show a predetermined set of (e.g., top 50) pre-authored visualizations (labeled 'C') that map to the input query. Sime implementations show scented widgets (labeled 'D') that support dynamically filtering the pre-authored content results. Suppose the user types a search query, "housing prices usa" in the input text box. The system detects that the token 'usa' is a geographic location and searches for a relevant data source in its data repository. The system finds the housing data source to be a match, and a map is dynamically generated as a Q&A response to the query (labeled 'B' in FIG. 3). In addition, as part of exploratory search, the query tokens are used as keywords to match any pre-authored visualizations. A grid of thumbnails is displayed to serve as a preview to the user for browsing and exploration (labeled 'C' in FIG. 3). Each thumbnail is hyperlinked to its corresponding visualization file that the user can choose to peruse in more detail or download to a local machine. The title, author name, and creation date of the visualization are displayed below each thumbnail to provide additional context. Scented widgets appear on the right side of the exploratory search panel to support faceted browsing of the pre-authored visualizations (labeled 'D' in FIG. 3). The user can narrow down the search results by simultaneously applying one or more filters, such as author name, visualization type, and the creation date.

Example System

Figure 4:
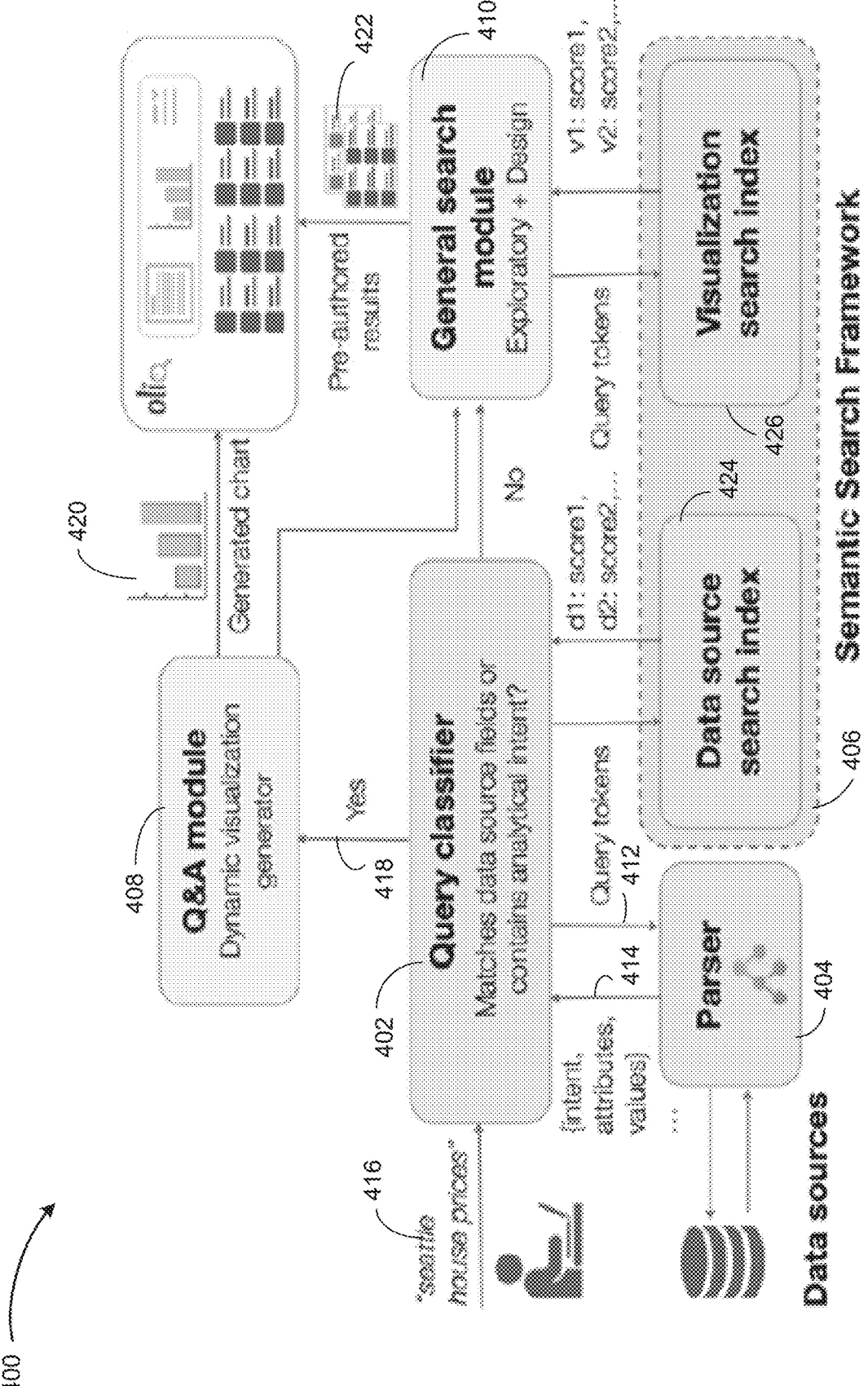
FIG. 4 is a schematic diagram of an example system, according so some implementations.

FIG. 4 is a schematic diagram of an example system 400, according so some implementations. The example shows various components: a query classifier 402, a parser 404, a semantic search framework 406, a Q&A module 408, and general search modules 410. The query classifier 402 checks a query 416 for the presence of tokens 412 that refer to fields from the data sources and analytical intents from the parsed query 414 (e.g., intent, attributes, and values) from the parser 404. If present (418), dynamically generated visualizations 420 from the Q&A search component 408 are rendered, along with pre-authored visualization results 422 from the general search components (exploratory and design) 410. The semantic search framework 406 includes both a data source search index 424 and a visualization search index 426.

In some implementations, the interface is implemented as a web-based application using Python and a Flask backend connected to a Node.js frontend. Some implementations use Elasticsearch, an open-source full-text Java search engine that is designed to be distributive, scalable, and with near real-time query execution performance.

In some implementations, a repository of curated data sources is included in the system for Q&A search. The data sources can be stored in a variety of formats, such as a relational database, JSON, XML, flat files, or tabular CSV files. Some implementations include data sources across a variety of familiar topics, such as sales, sports, world events, entertainment, and civic issues.

Example Data Repositories and Metadata

Unlike traditional document search, data sources and visualizations tend to be text-sparse, with limited searchable text content. Hence, some implementations augment the data repositories with additional metadata and semantics that help the system's understanding and interpretation of the search queries. Specifically, in some implementations, data fields (attributes) and data values in the data sources are linked to ontological concepts, including synonyms (e.g., 'film' and 'movie') and related terms (e.g., 'theft,' 'burglary,' and 'crime'). In some implementations, the system includes a small hierarchy of hypernyms and hyponyms, from Wordnet, whose depth typically ranges up or down to two hierarchical levels (e.g., ['beverage,' 'drink']→ ['espresso,' 'cappuccino']). In some implementations, metadata also includes data types (e.g., 'text,' 'date,' 'Boolean,' 'geospatial,' 'temporal,' and 'numeric') and attribute semantics, such as currency type (e.g., United States Dollar). This information can also be inferred using data pattern matching techniques. The metadata also identifies attributes that are measures (e.g., attributes that can be measured, aggregated, or used for mathematical operations) and dimensions (e.g., fields that are categorical in nature and cannot be aggregated except for counting). This set of metadata information is then added to the semantic search framework.

In some implementations, the pre-authored content is a set of 75,000 or more visualizations sourced from Tableau Public, a free community-based platform. In some implementations, the topics of the visualizations are reflective of that demographic of users and/or include themes, such as natural calamities, health, world events, financial news, entertainment, and sports.

In some implementations, given an XML visual specification of a Tableau workbook, the system traverses the document object model (DOM) structure and indexes any text metadata that can be extracted from the visualizations. Extracted metadata can include visualization title, caption, tags, description, author name, profile, visualization marks encoded in the visualization, and/or visualization type. To support design search for recognizing visualization types mentioned in the search query, some implementations include a general list of visualization types and their linguistic variants in the semantic search framework. FIG. 5 shows an example JSON list 500 of visualization types and their concepts that are stored as metadata to support design search, according to some implementations.

In addition to CSV data sources and Tableau visualizations, the architecture can include additional data repositories, including Vega-lite charts, and knowledgebase articles.

threshold for relevant data source matches. If both conditions (i.e., the presence of an analytical intent and the match score meets the threshold criteria), then Q&A search is first invoked to dynamically generate visualization responses to the given query (line 13). Otherwise, general search is invoked to return pre-authored content from the data repository (line 16).

An example algorithm (Algorithm 1 referenced above) is shown below. The algorithm classifies the search behavior based on whether the query contains an analytical intent and whether there is a match on one or more curated data sources.

```
 1:    function QUERYCLASSIFIER(query)
 ▷ Boolean to check if there is an analytical intent in query.
 2:        hasAnalyticalIntent ← False
 ▷ Boolean to check if there is a data source match.
 3:        hasDSMatch ← False
 ▷ Contains the match scores for query and each data source, ds.
 4:        dsScores ← getDSScores (query, ds)
 ▷ Contains the normalized match scores for query and each data source, ds.
 5:        normScores ← norm(dsScores)
 ▷ Predetermined thresholds set for field match in ds and normScores.
 6:        fieldMatch, normMatch
 ▷ Check if the parsed query contains an analytical intent.
 7:        if (parseForAnalyticalIntent (query) then
 8:            hasAnalyticalIntent ← True
 9:        end if
 ▷ Check if the query tokens match fields in ds and normalized match score to ds is
 greater than a pre-determined threshold.
 10:        if (dsScores ['fields'] > fieldMatch) and (normScores > normMatch)) then
 11:            hasDSMatch ← True
 12:        end if
 ▷ If query has an analytical intent and contains tokens matching a ds, invoke Q&A
 search before general search, else just invoke general search.
 13:        if (hasAnalyticalIntent and hasDSMatch) then
 14:            invokeQ&ASearch(query, ds)
 15:        end if
 16:        invokeGeneralSearch(query)
 17:    end function
```

Example Query Classifier

In some implementations, a natural language search query is input to a query classifier. In some implementations, the classifier supports federated query search, which is the process of distributing a query to multiple search repositories and combining results into a single, consolidated search result. Thus, it appears to users as if they were interacting with a single search instance. In this context, a user can search over heterogeneous data repositories (i.e., both data sources and visualizations) without having to change or modify how they structure the query input. The query classifier passes the search tokens to a parser and the data source search index (which is part of the semantic search framework) and determines if the system needs to generate a Q&A search to dynamically generate visualization responses, or simply conduct a general search that supports both exploratory and design searches. Algorithm 1 shown below is an example query classification process, according to some implementations. At a high level, the query classifier passes the query tokens to a parser (line 7) to determine if the query contains any analytic intents such as aggregation, correlation, temporal, or geospatial expression. The query classifier also passes the query tokens to the semantic search framework to determine if the query tokens match fields in any of the data sources (e.g., 'prices' to price in the housing data source) and the normalized match score is greater than a predetermined threshold (line 10). In practice, fieldMatch=2 and normMatch=. 3 provide a reasonable Example Parser In some implementations, the parser removes stop words (e.g., 'a' and 'the') and conjunctions/disjunctions (e.g., 'and' and 'or') from the search query and extracts a list of N-gram tokens (e.g., "Seattle house prices"→[Seattle], [house], [prices], [house prices], [Seattle house prices]). In some implementations, the parser employs a Cocke-Kasami-Younger (CKY) parsing algorithm and generates a dependency tree to understand relationships between words in the query. The input to the underlying CKY parser is a context-free grammar with production rules augmented with both syntactic and semantic predicates to detect the following analytical intents in the search query:

Grouping. Partition the data into categories (e.g., by a data attribute).

Aggregation. Group values of multiple rows of data together to form a single value based on a mathematical operation (e.g., 'average,' 'median,' 'count,' or 'distinct count').

Correlation. Statistical measure of the strength of the relationship between two data attributes (measures) (e.g., 'correlate' or 'relate').

Filters and limits. Finite sets of operators that return a subset of the data attribute's domain (e.g., 'filter to,' 'at least,' 'between,' or 'at most'). Limits are also a finite set of operators akin to filters that return a subset of the attribute's domain, restricting up to n rows (e.g., 'top' or 'bottom').

Temporal. Time and date expressions containing temporal tokens and phrases (e.g., 'over time,' 'year,' 'in 2020', or 'when').

Geospatial. Geospatial expressions referring to location and place (e.g., 'in Canada,' 'by location,' or 'where').

To help with detecting data attributes and values along with the intents, the parser has access to the set of curated data sources and their metadata. The parser then compares the N-grams to available data attributes looking for both syntactic similarities (e.g., misspellings) and semantic similarities (e.g., synonyms) using the Levenshtein distance and the Wu-Palmer similarity score, respectively. If the parser detects one or more of the aforementioned analytical intents, it returns the intents along with its corresponding data attributes and values to the query classifier.

Semantic Search Framework

Figure 6:
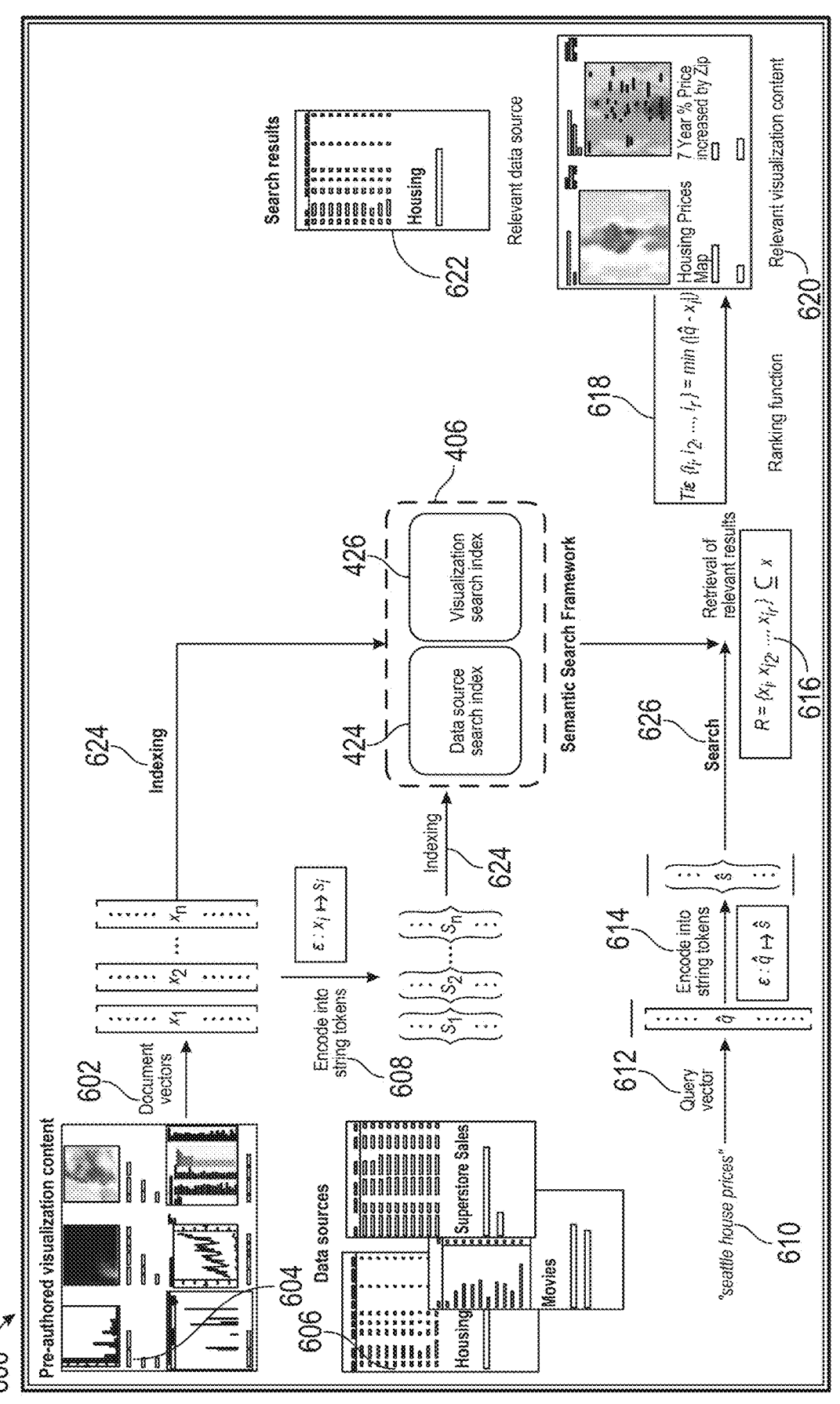
FIG. 6 is a schematic diagram of an example pipeline for a semantic search framework, according to some implementations.

Some implementations include a semantic search framework that includes two phases: indexing and searching content and metadata in the data repositories. This two-phase process applies to content in the data repositories, including both the curated data sources and visualization content. FIG. 6 is a schematic diagram of an example pipeline 600 for a semantic search framework, according to some implementations. Document vectors X 602 from pre-authored visualization content 604 and data sources 606, along with their corresponding encoded string tokens S 608, are indexed (624) in the semantic search framework 406 as two data repository indices (a data source search index 424 and a visualization search index 426). At search time, a query vector q 612 from an input search query 610 (e.g., "seattle house prices") is encoded into string tokens 614, and used to retrieve a set of relevant results 616 for both the visualization content and data sources. Using a ranking function 618 $T_i \in \{i_1, i_2, \ldots, i_r\} = \min(|\hat{q} - x_i|)$, the result set is finally ranked to return the top-scoring results (relevant visualization content 620 and relevant data sources 622).

The indexing phase 624 creates indices for each of the data repositories (data sources and visualization content) along with their metadata to support federated searching. Given a data source and visualization content with associated metadata (i.e., attributes, data values, chart type, and author name), each file is represented as a document vector, $x_i$, where:

$$X = \{x_1, x_2, \ldots, x_n\} \qquad (1)$$

Some implementations also store N-gram string tokens from these document vectors to support partial and exact matches in the system:

$$S = \{s_1, s_2, \ldots, s_n\} \qquad (2)$$

where $s_i = \varepsilon(x_i)$ for some encoder, which converts the document vectors into a collection of string tokens of cardinality n. The original vectors X and encoded tokens S are stored in the semantic search engine index by specifying the mapping of the content (i.e., defining the type and format of the fields in the index). Some implementations store the text as keywords in the index, supporting exact-value search, fuzzy matching to handle typos and spelling variations, and N-grams for phrasal matching. A scoring algorithm, tokenizers, and filters are specified as part of the search index settings to determine how the matched documents are scored with respect to the input query and the handling of tokens, such as the adding of synonyms from a thesaurus, removal of stop-words (e.g., 'a,' 'the,' and 'for') and duplicate tokens, and converting tokens to lowercase.

In some implementations, the search phase 626 has two steps: retrieval 616 and ranking 618. Given an input query, q, which is represented as a query vector, $\hat{q}$ with query tokens $q_1, q_2, \ldots q_j$, some implementations encode the vector into string tokens, $\hat{s} = \varepsilon(\hat{q})$ using the same encoder, from the indexing phase. The search process retrieves the most relevant r document vectors, $\mathcal{R} = \{x_1, x_2, \ldots x_r\}$ as candidates based on the amount of overlap between the query string token set q and the document string tokens in $\{s_1, s_2, \ldots s_n\}$. More specifically, the scoring function maximizes search relevance by computing:

$$\{x_1, x_2, \ldots, x_r\} = r_{max_{i \in \{1,2,\ldots,n\}}}|\hat{s} \cap s_i| \qquad (3)$$

Some implementations subsequently rank the vectors in the candidate search result set, $\mathcal{R}$ based on BM25 scoring with respect to the query vector, $\hat{q}$. BM25 is essentially a bag-of-words retrieval scoring function that ranks documents based on the query terms appearing in each document, regardless of their proximity within the document. It is a preferred metric for computing similarities between vectors as the method corrects for variations in vector magnitudes resulting from uneven-length documents. Given $\hat{q}$, the BM25 score of a document vector, $x_i$ is:

$$BM25(\hat{q}, x_i) = \sum_{i=1}^{n} IDF(q_j) \cdot \frac{f(q_j, x_i) \cdot (k_1 + 1)}{f(q_j, x_i) + k_1 \cdot \left(1 - b + b\frac{|x_i|}{avgdl}\right)} \qquad (4)$$

where $f(q_j, x_i)$ is the number of times that $q_j$ occurs in the document vector $x_i$, and avgdl is the average document vector length in the search index. $k_1$ and b are constants to further optimize the scoring function.

$k_1 \in [1.2, 2.0]$ and b=0.75 tend to provide reasonable ranking behavior. The Inverse Document Frequency (IDF) measures how often a term occurs in all of the documents and ranks unique terms in documents higher. It is computed as:

$$IDF = \ln\left(1 + \frac{(docCnt - f(q_j) + 0.5)}{f(q_j) + 0.5}\right) \qquad (5)$$

where docCnt is the total number of documents that have a value for the given query token $q_j$ and $f(q_j)$ is the number of documents that contains the $i^{th}$ query term.

The BM25 scoring function sorts the vectors in descending order of normalized BM25 scores, with $b \in [0, 1]$, i.e., the higher the score, the higher the rank, creating the final ranked search result set $\mathcal{T}$ ranked based on the minimum difference between the query and each of the document vectors:

$$\mathcal{T}_{i \in \{i_1, i_2, \ldots, i_r\}} = \min(|\hat{q} - x_i|) \qquad (6)$$

In some implementations, the search request is then passed to an elastic search server. The system computes Equations 3 and 4 and returns a ranked result set of either data sources (used for Q&A) or visualization content used for both exploratory and design search scenarios.

Example Q&A Module

The Q&A module interprets the analytical intent expressed in the input search queries and dynamically generates visualization responses based on the list of top-matched data sources returned from the semantic search framework, as described above. In some implementations, the module accepts tabular CSV datasets for the top-matched data sources as input. In some implementations, the visualizations in the tool are created using Vega-Lite.

Figure 7:
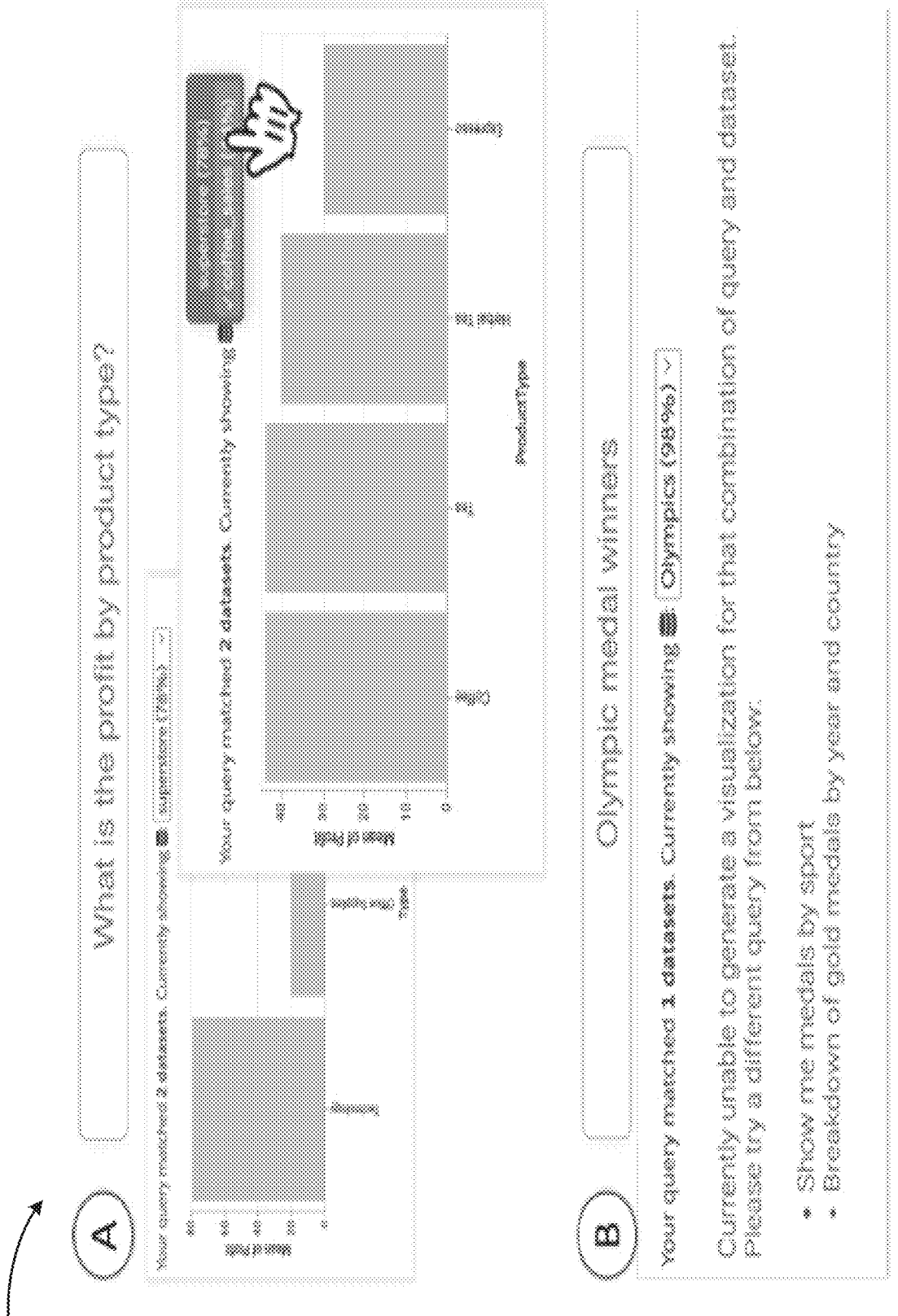
FIG. 7 shows an example interface for supporting Q&A search, according to some implementations.

FIG. 7 shows an example interface 700 for supporting Q&A search, according to some implementations. The interface provides interaction and scaffolding support (see label 'A'). In the case that multiple data sources are identified as top matches to a given search query, a drop-down list shows the ranked list of data sources along with their corresponding percentage match scores. In the case that no valid visualization can be generated for a given search query even though there is a match to a data source, some implementations display a list of query suggestions (see label 'B') to choose from, to generate a visualization response.

In some implementations, the interface and functionality for Q&A search is similar to that of natural language interfaces (NLIs) for visual analysis with a few extensions that are inherent to the Q&A behavior in the context of semantic search. For instance, the interface displays text showing a match (if any), to one or more data sources, along with a drop-down menu of the matched data sources. A visualization is rendered based on attributes, values, and the analytical intent in the query, along with a text summary describing the visualization (e.g., the text 108 in FIG. 1A). A user can peruse the drop-down list of other data source alternatives, along with their corresponding percentage match scores (computed as described above), and choose to switch to another data source in the drop-down list as shown in FIG. 7 (see label 'A'). In cases where there is a match to a data source for the query, but the tokens in the query do not resolve to valid attributes and values within the data source, some implementations display suggested queries for the data source, an example of which is shown in FIG. 7 (see label 'B'). These query suggestions are generated using a template-based approach that is based on a combination of attributes from the data source and data interestingness metrics.

In some implementations, the visualization generation process for Q&A search supports three encoding channels (x, y, and color) and four mark types (bar, line, point, and geo-shape). These marks and encodings support the dynamic generation of bar charts, line charts, scatterplots, and maps that cover the range of analytic intents described in Section 4.5. Some implementations select the default visualization employing rules to determine mark types based on the mappings between the visual encodings and attribute data types (e.g., showing a scatterplot if two quantitative attributes are mapped to the xy-channels and showing a line chart if a temporal attribute is visualized on the x-axis with a quantitative attribute on the y-axis).

Some implementations display a dynamic text summary describing the generated visualization. While template-based approaches are viable options for the summary generation process, some implementations employ a large language model (LLM)-based approach. Passing the chart data as-is to an LLM application to generate a description can generate wrong statistics or even hallucinations depending on the data domain context. To overcome these challenges but still provide an eloquent description, some implementations follow a combined approach using both basic statistical computations and an LLM. Specifically, the input to an LLM-based chat application is a prompt containing a statistical description that is extracted from the generated visualization using a set of heuristics defined in prior data insight recommendation tools. For instance, for bar charts, some implementations identify the minimum/maximum and average values; for scatterplots, some implementations compute the Pearson's correlation coefficient, and so on. Consider the search query, "sales by region", which results in a bar chart displaying Sales across four Regions. An example of the statistical description (keyStats) from this bar chart is:

Region: Central has a minimum value of $220 for Sales
Region: South has the maximum value of $240 for Sales
Average Sales across Region is: $230.

The corresponding prompt to the LLM application then becomes Rephrase the following input more eloquently: \n '$ {keyStats}\n', which ultimately generates the text summary: "The Sales in Central Region had the lowest value of $220, while South Region had the highest value of $240. The average Sales across all Regions was $230.

Example General Search Module

In some implementations, the general search module 410 displays thumbnails of pre-authored visualization content along with information such as title and date. The thumbnail images are hyperlinked to the corresponding Tableau Public workbook URLs if users choose to download or analyze the visualization in more detail. The module enables two types of searches: exploratory and design.

Figure 8:
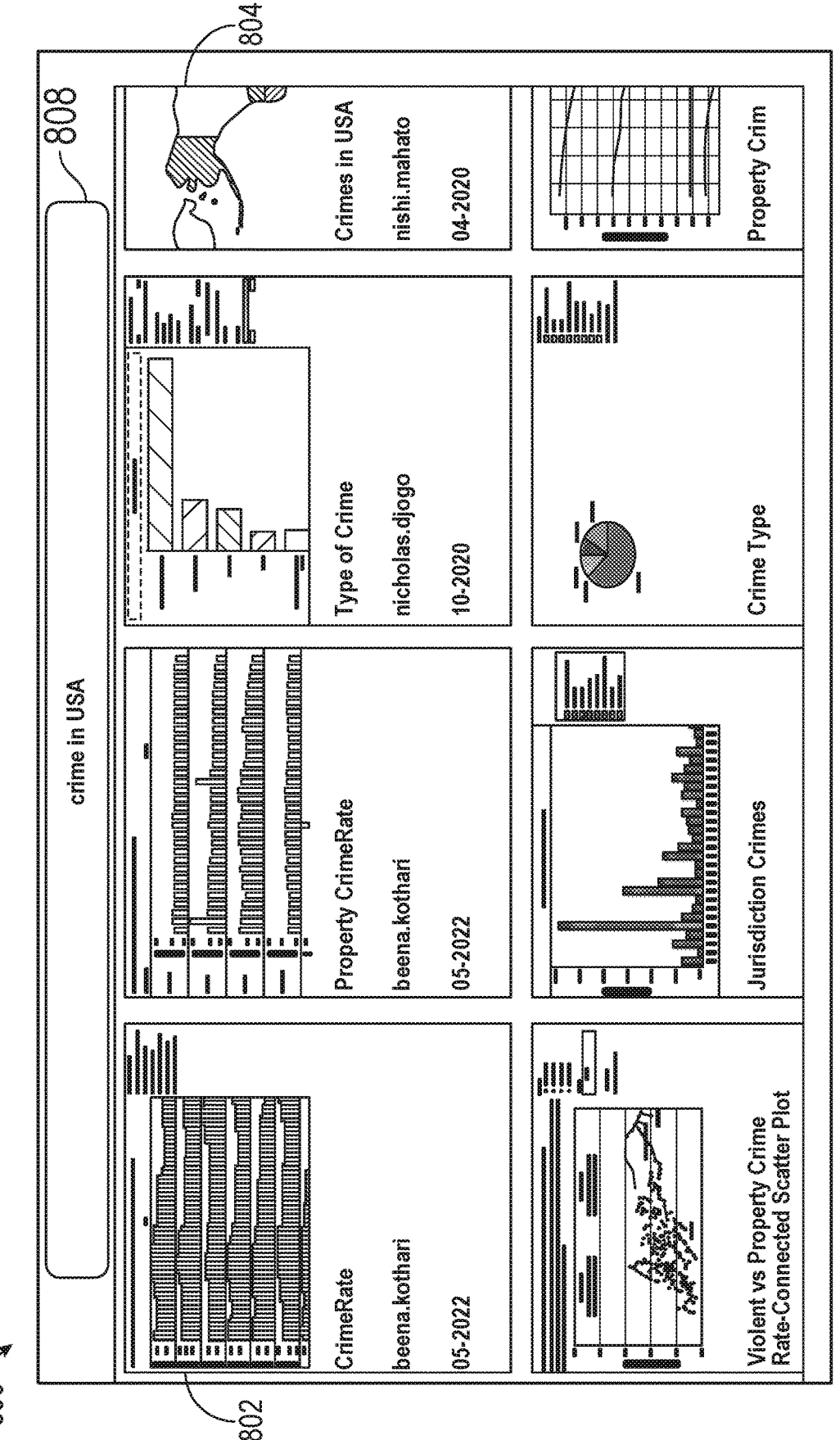
FIG. 8 shows example exploratory search results, according to some implementations.

FIG. 8 shows two partially superimposed example exploratory search results 800, according to some implementations. Some implementations display thumbnail results 802 and 804 of pre-authored visualizations based on keywords found in the input search queries (e.g., "world population" 806 and "crime in usa" 808). Exploratory search returns visualization results based on keyword matches in the input search query (e.g., "world population" 806).

Figure 9:
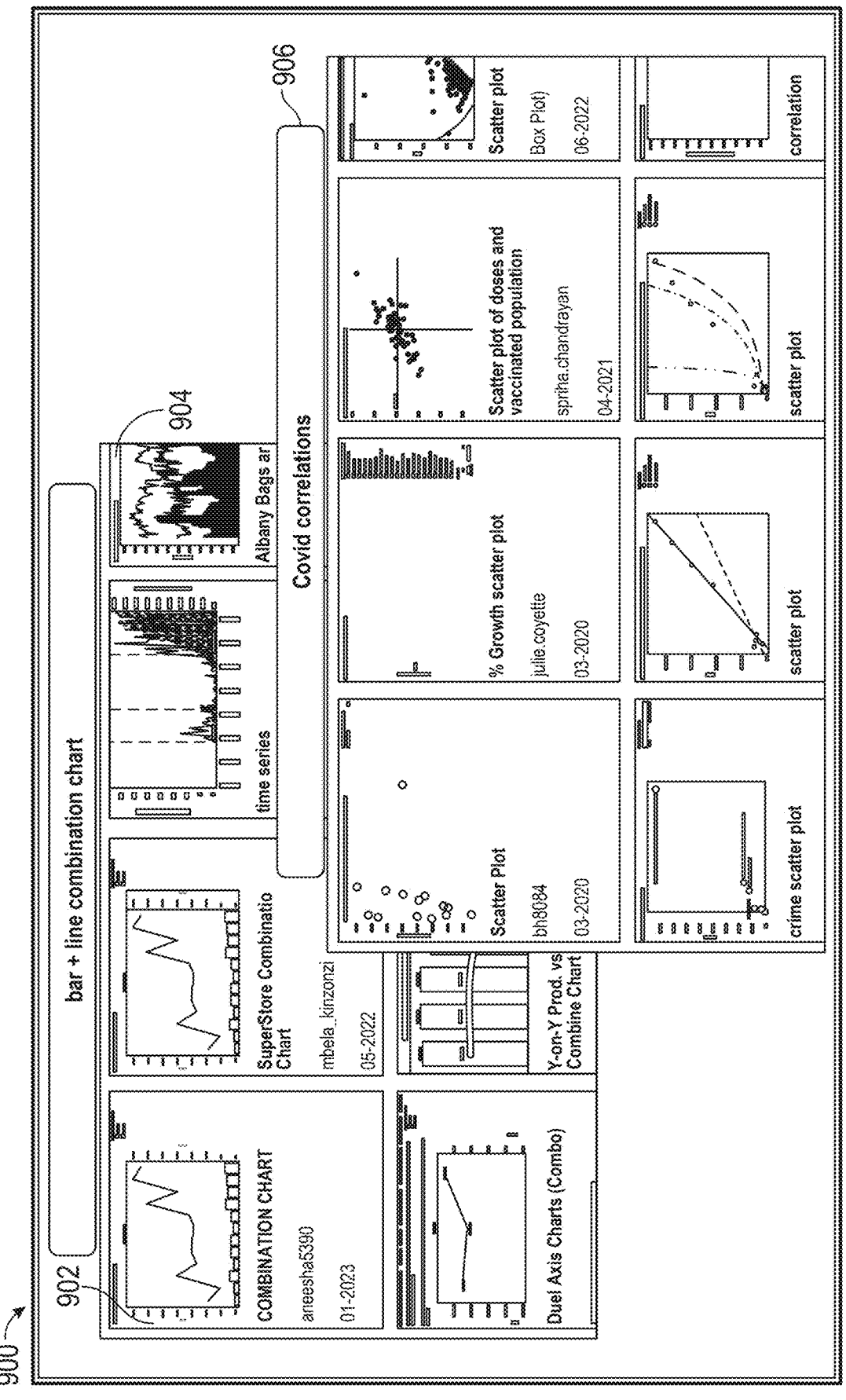
FIG. 9 shows example design search results, according to some implementations.

FIG. 9 shows two partially superimposed example design search results 900, according to some implementations. Some implementations display thumbnail results 902 and 904 of pre-authored visualizations for combinations of chart types (e.g., bar and line charts) as well as for analytical concepts that allude to a specific visualization type (e.g., 'correlation' for a scatterplot). Design search is a special form of exploratory search that returns visualization results specifically for keywords containing tokens referring to visualization types, their synonyms, and related concepts (e.g., "covid correlations" 906).

Example Search Interfaces

Figures 1, 10:
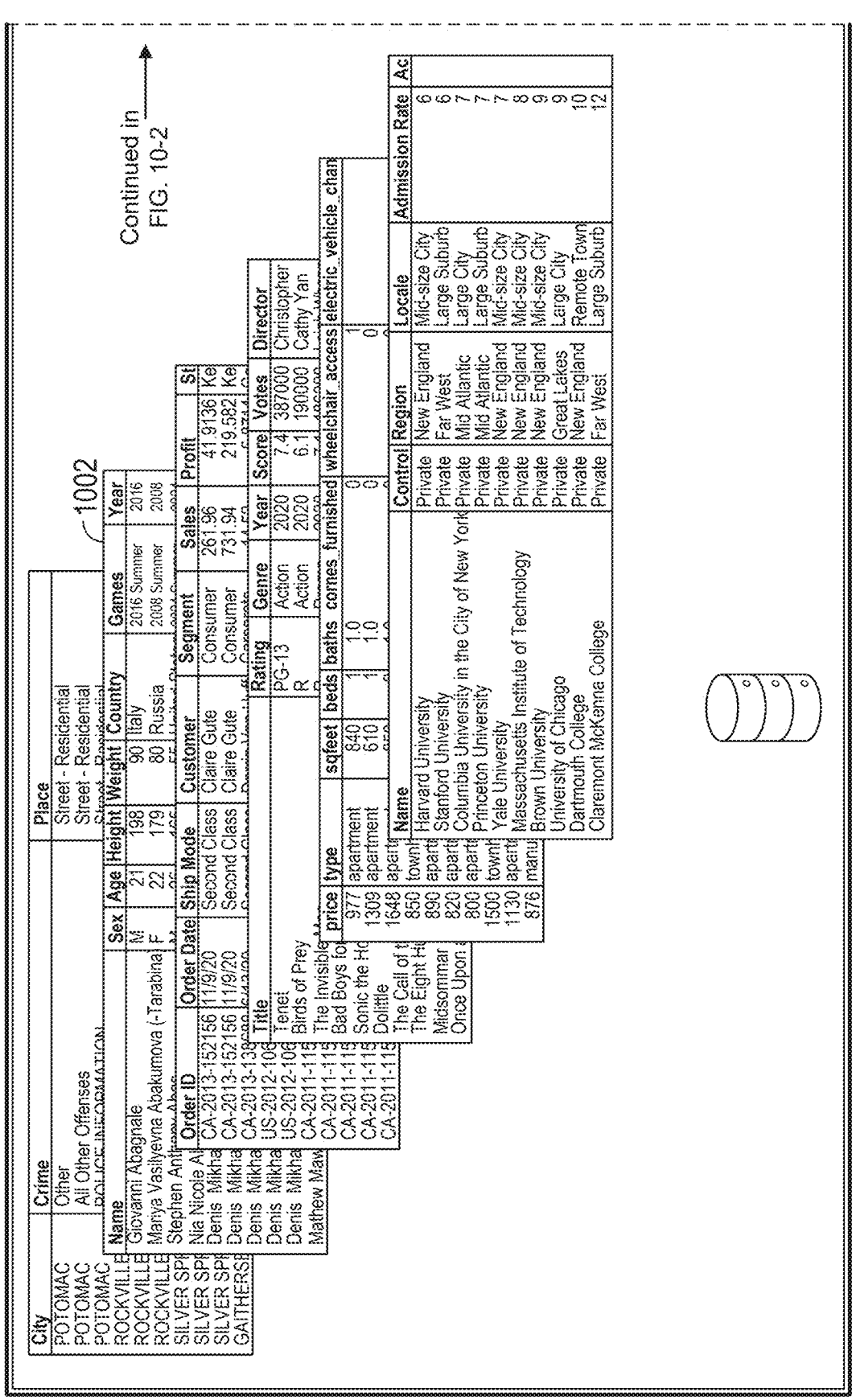
Figures 1, 2, 10:
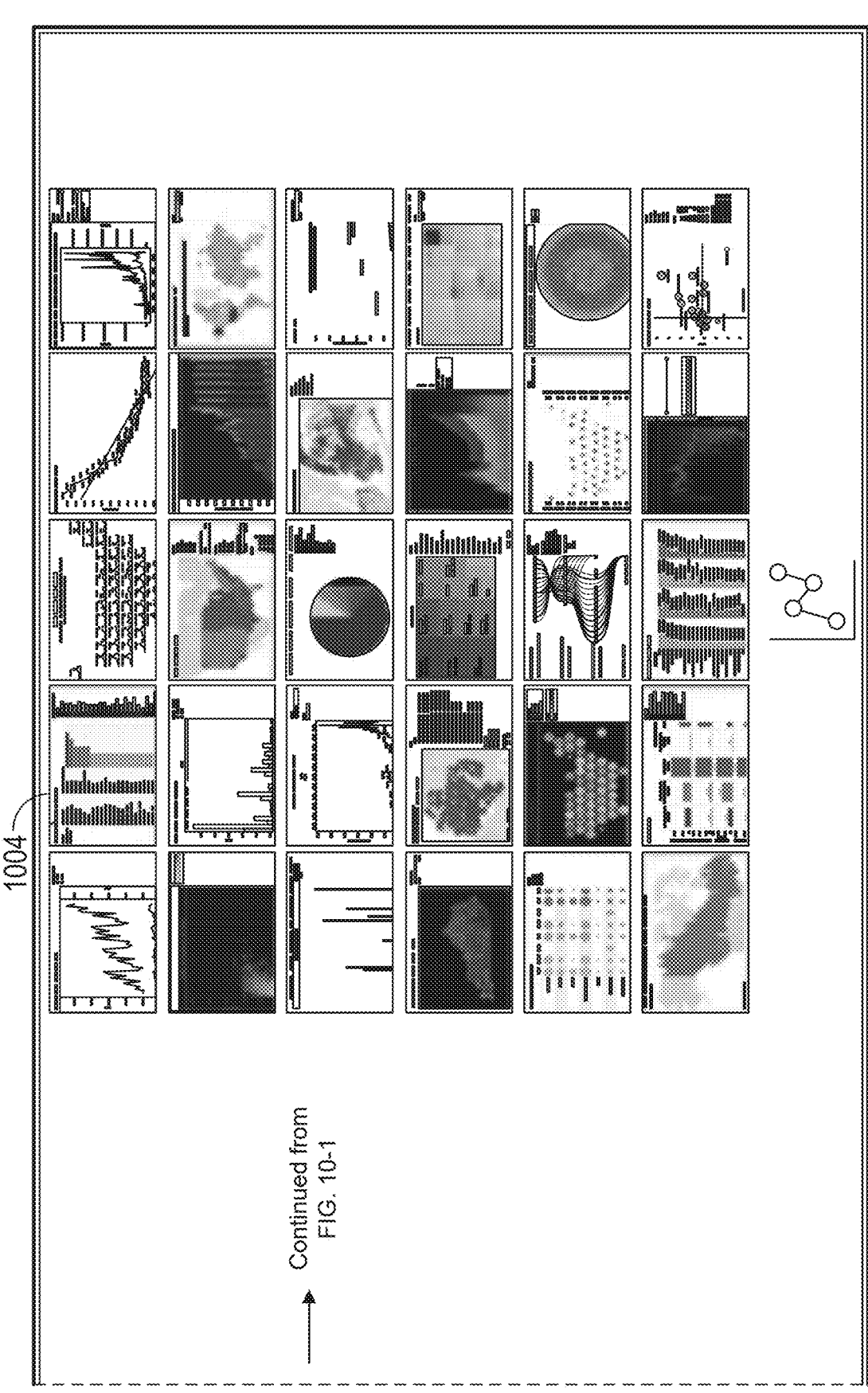

FIGS. 10-1 and 10-2 collectively show an example interface 1000 displaying a sample of available data sources 1002 and pre-authored visualizations 1004 indexed from a database (e.g., Tableau public), according to some implementations. Users of a search interface may ask a number of questions when interacting with the interface. For example, a user may want to find examples of a tree map to build on the examples. Another example is a user wanting to learn about variation in COVID cases by country. Some users may ask what kind of visualizations other users are creating (e.g., to present election results).

Figure 11:
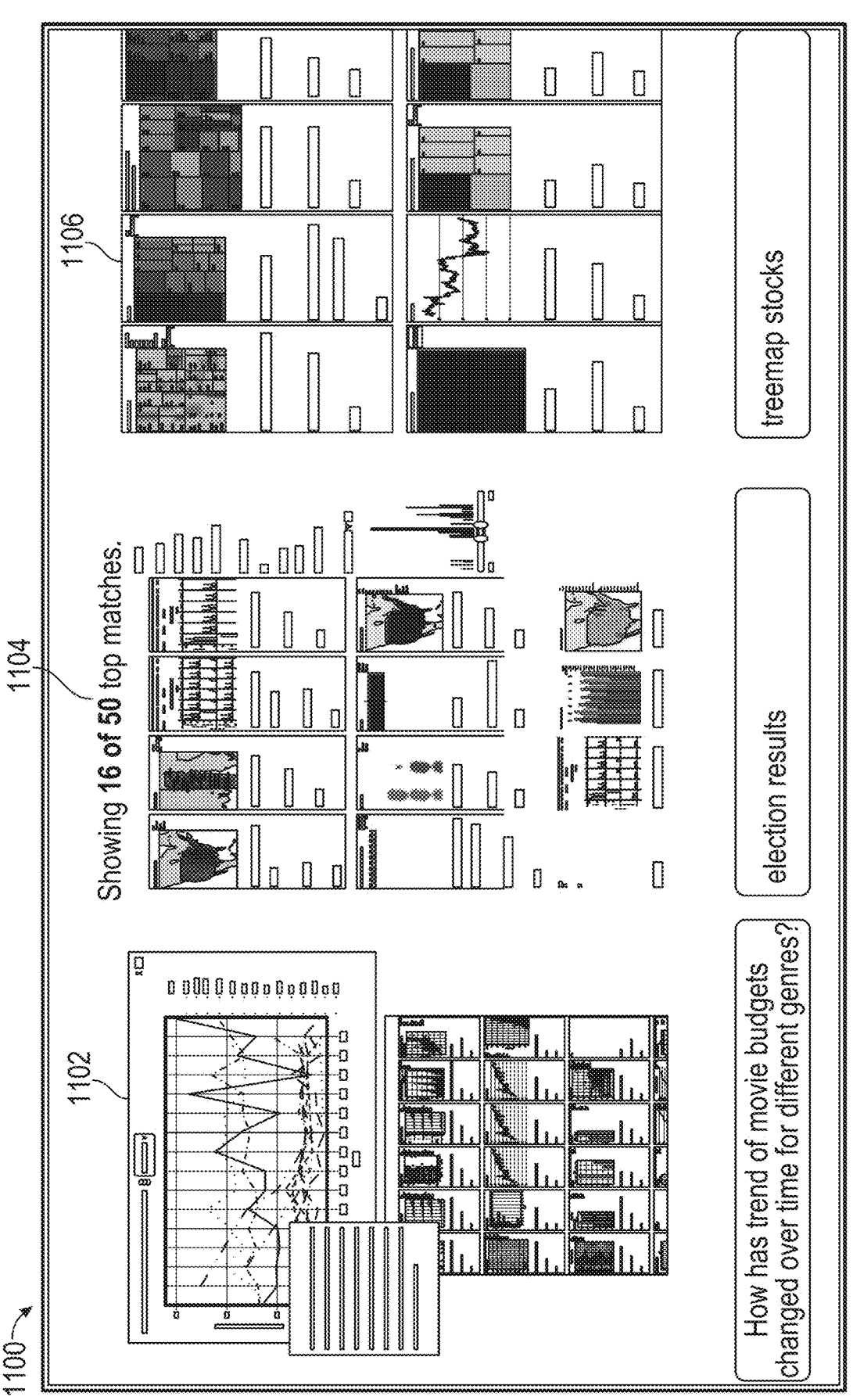
FIG. 11 shows example searches using a search interface in accordance with some implementations.

FIG. 11 shows example searches 1100 using a search interface in accordance with some implementations. The search interface enables users to perform a variety of searches 1100, according to some implementations. The first example 1102 shows a user asking "How has the trend of movie budgets changed over time for different genres?" The second example 1104 shows a user searching for "election results." And the third example 1106 shows a search for "treemap stocks."

Figures 1, 12A:
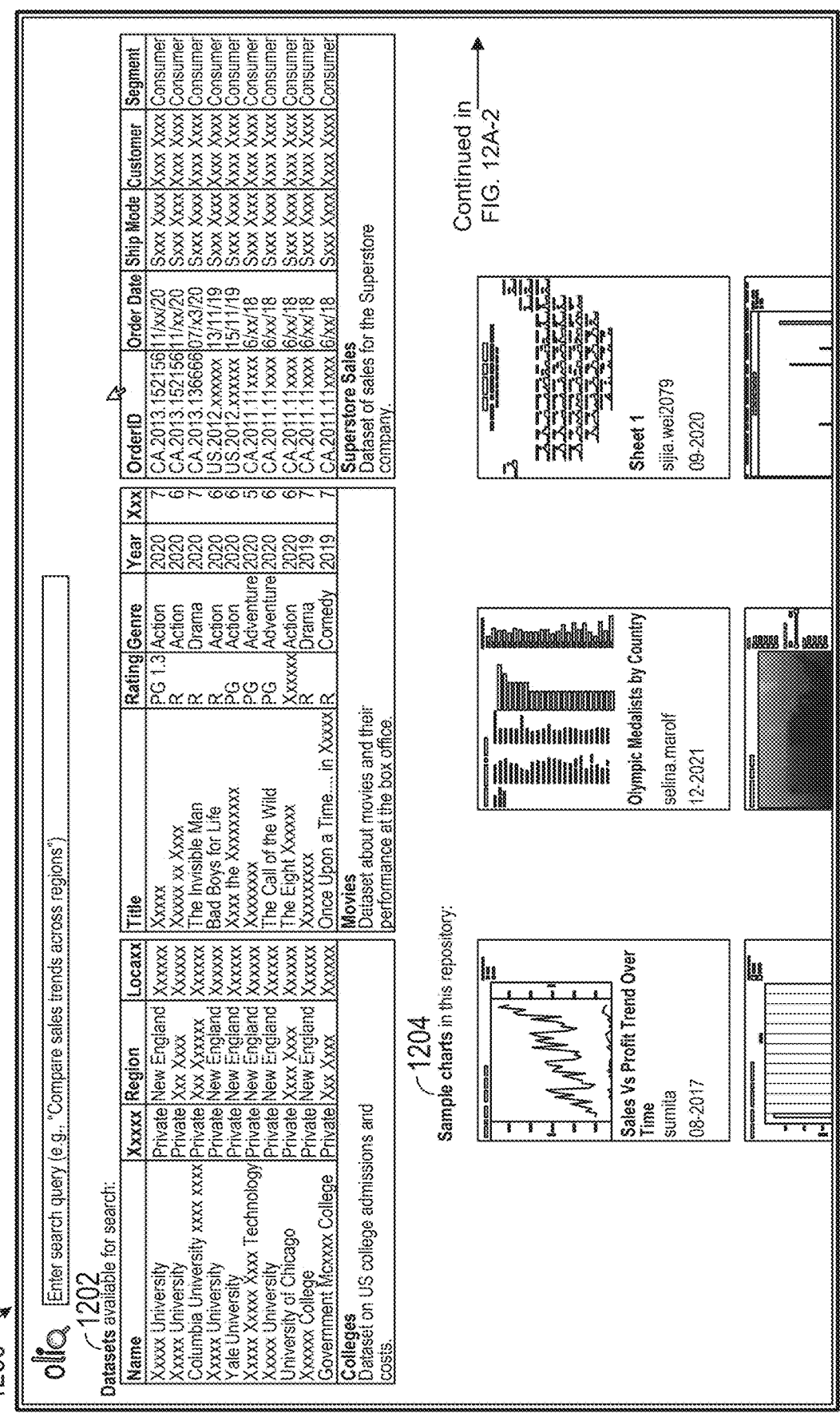

FIGS. 12A-1 and 12A-2 collectively show an example search interface 1200, according to some implementations. The example shows sample datasets 1202 available for search and sample charts 1204 in a repository.

Figures 1, 12B:
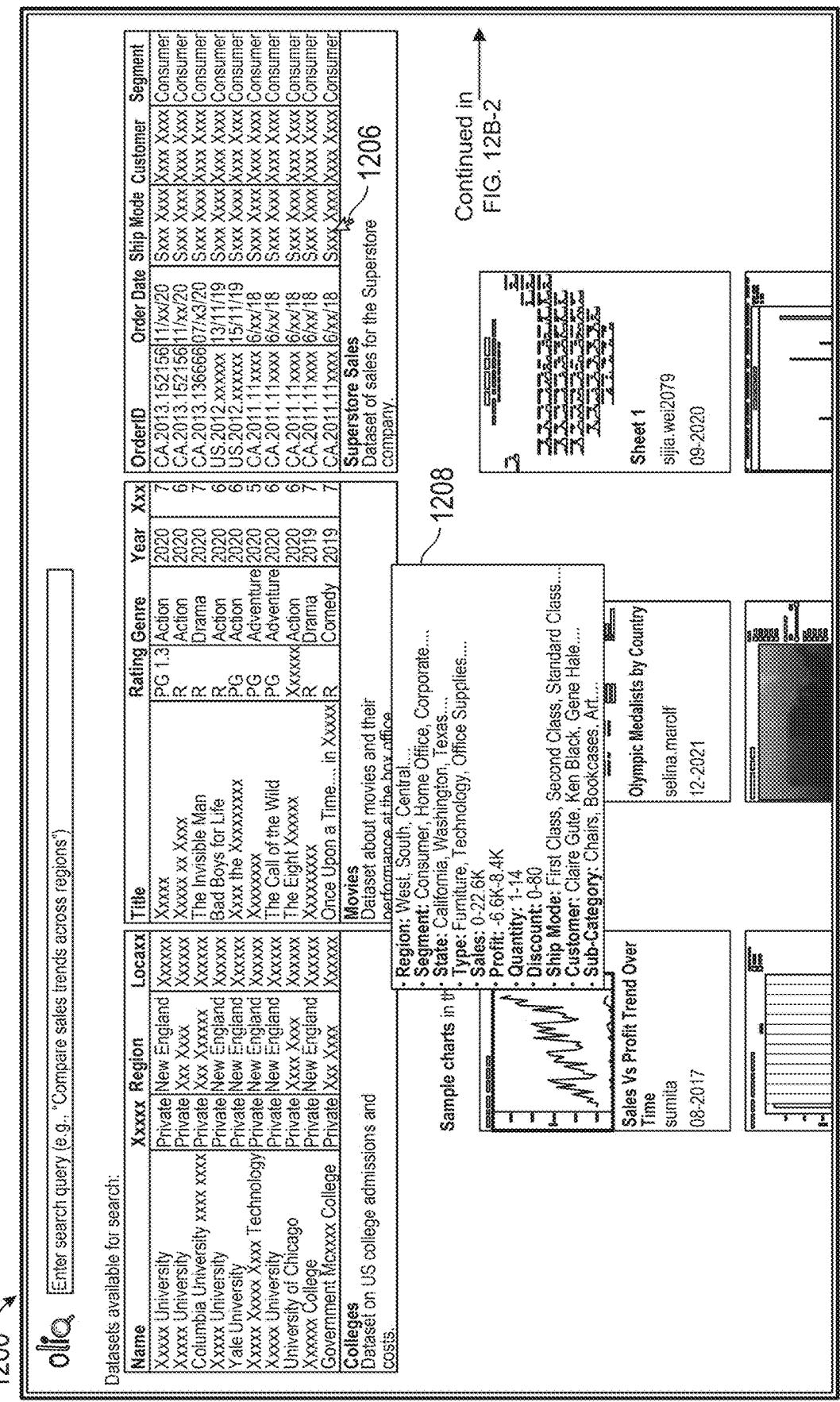
Figures 2, 12B:
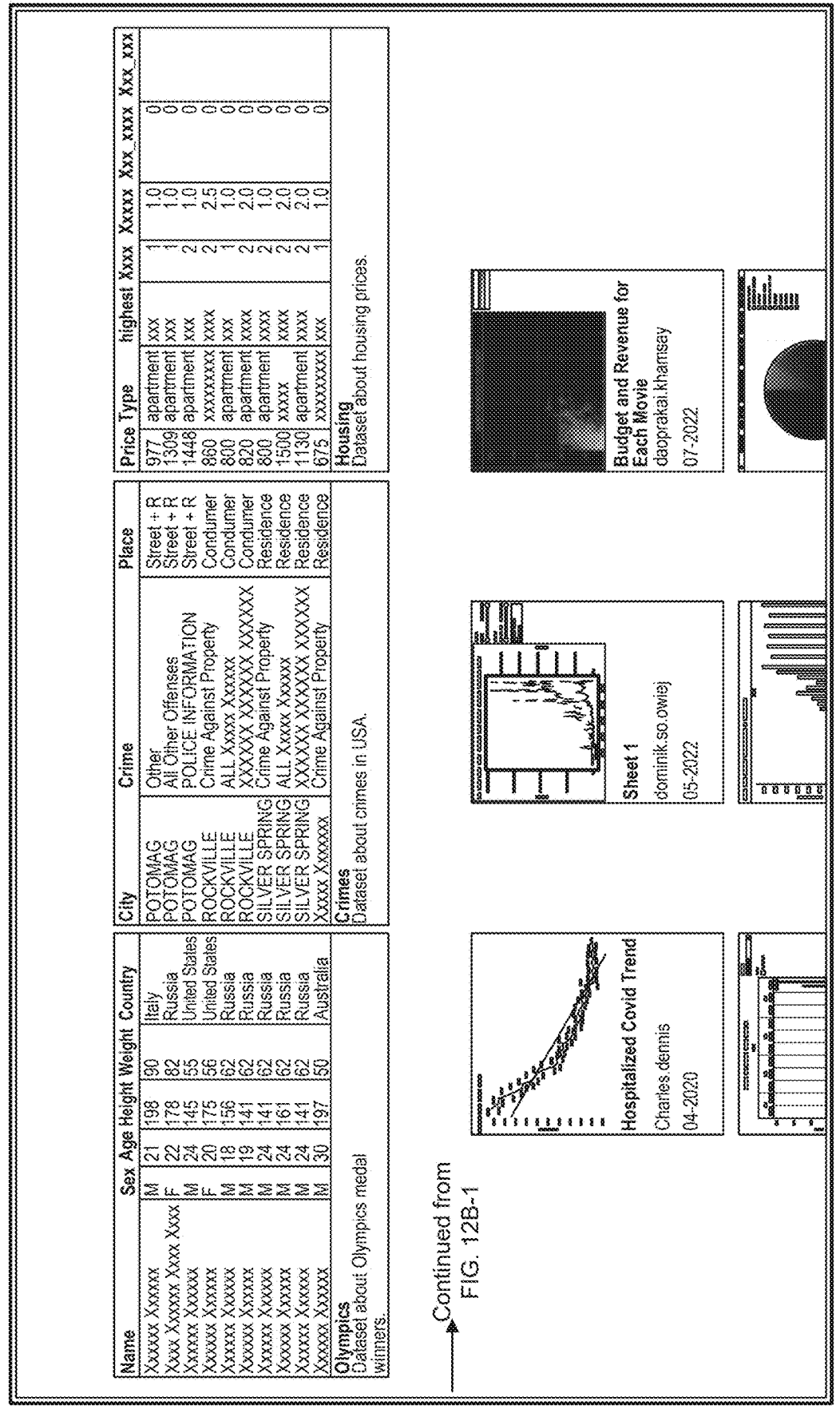

FIGS. 12B-1 and 12B-2 collectively show the example search interface 1200 with a preview of metadata 1208, according to some implementations. Users can hover 1206 on (or point to) data sources to preview the metadata and issue queries using the search box based on the metadata.

Figure 13A:
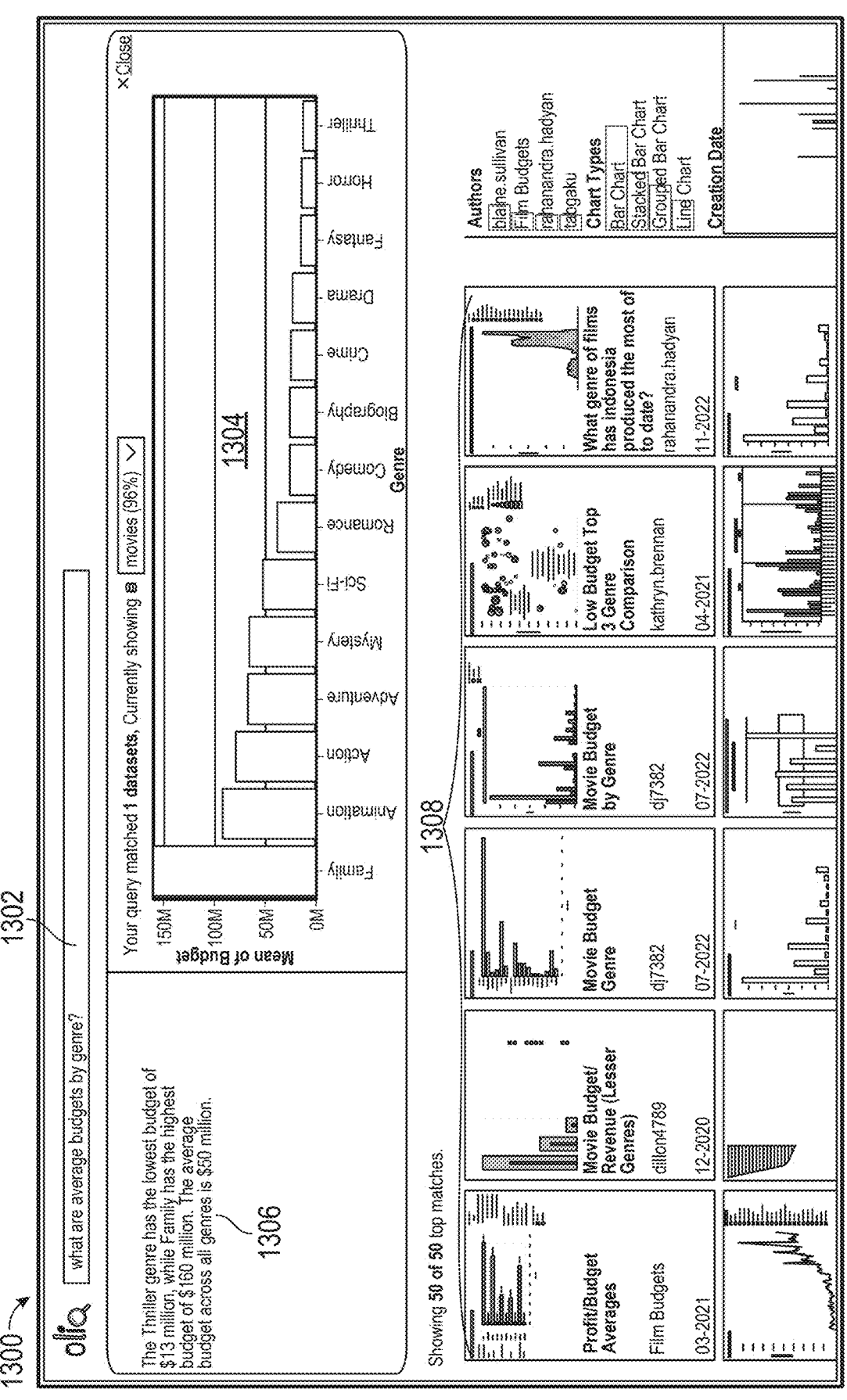
FIG. 13A shows an example search interface after a user enters a search query, according to some implementations.

FIG. 13A shows an example search interface 1300 after a user enters a search query 1302, according to some implementations. In this case, after receiving the query "what are average budgets by genre?" the system peruses through the available data sources to find any relevant data source. Determining a match with the movies data set, the system then dynamically generates a sorted bar chart 1304 to answer the given query and produces a text summary 1306 describing key takeaways from the chart. Besides finding a relevant data source and generating the dynamic response, the system also returns fifty relevant visualizations 1308.

Figure 13B:
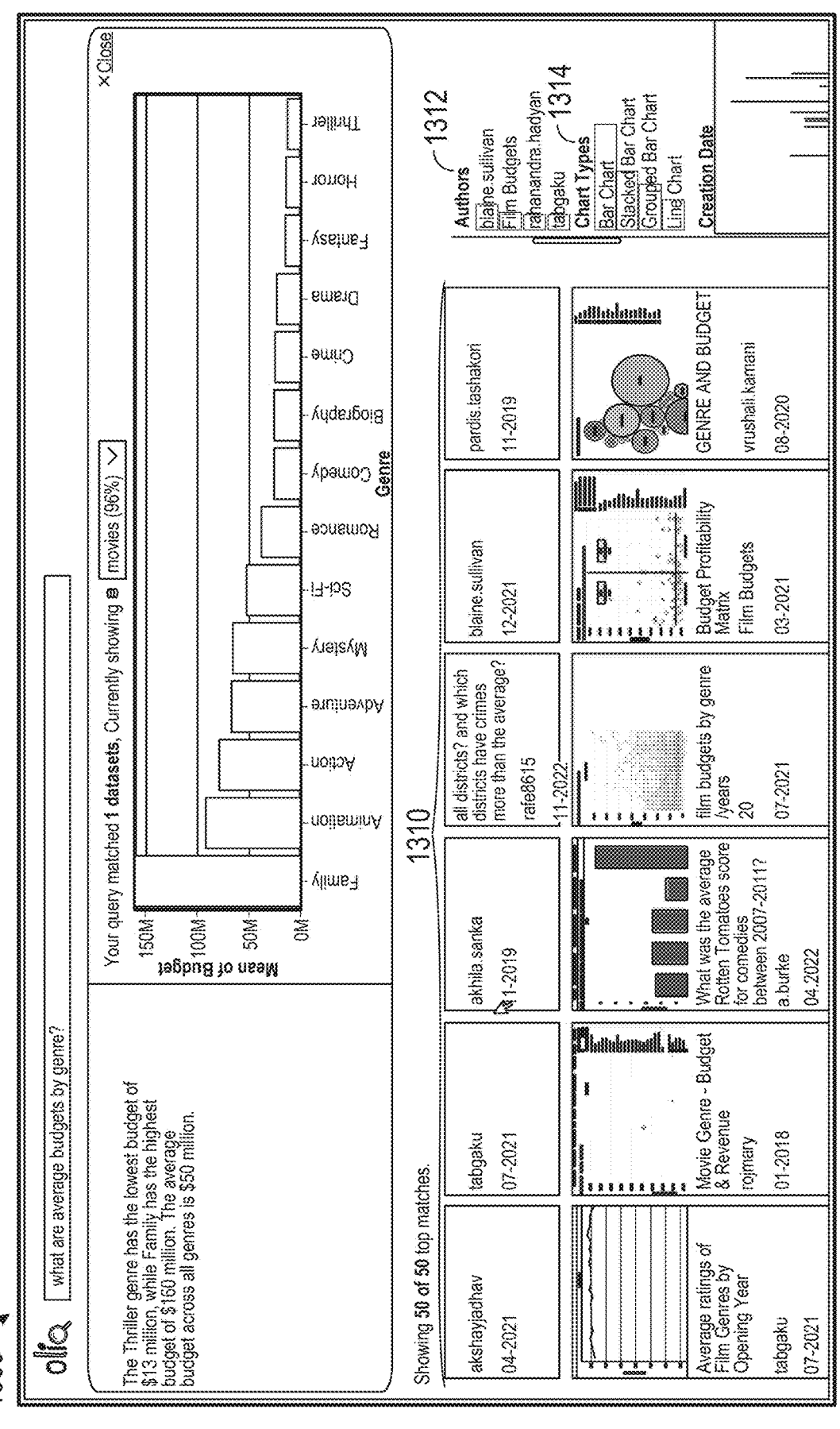
FIG. 13B shows another view of the example search interface shown in FIG. 13A, according to some implementations.

FIG. 13B shows another view of the example search interface 1300, according to some implementations. A different set 1310 of the relevant visualizations is shown. Users can skim through and explore these visualizations or leverage dynamic filtering widgets (e.g., an author filter 1312 or a chart type filter 1314) to identify visualizations of interest. If a query is ambiguous or unclear, in some implementations, the system also provides users options to override its default selection.

Figure 13C:
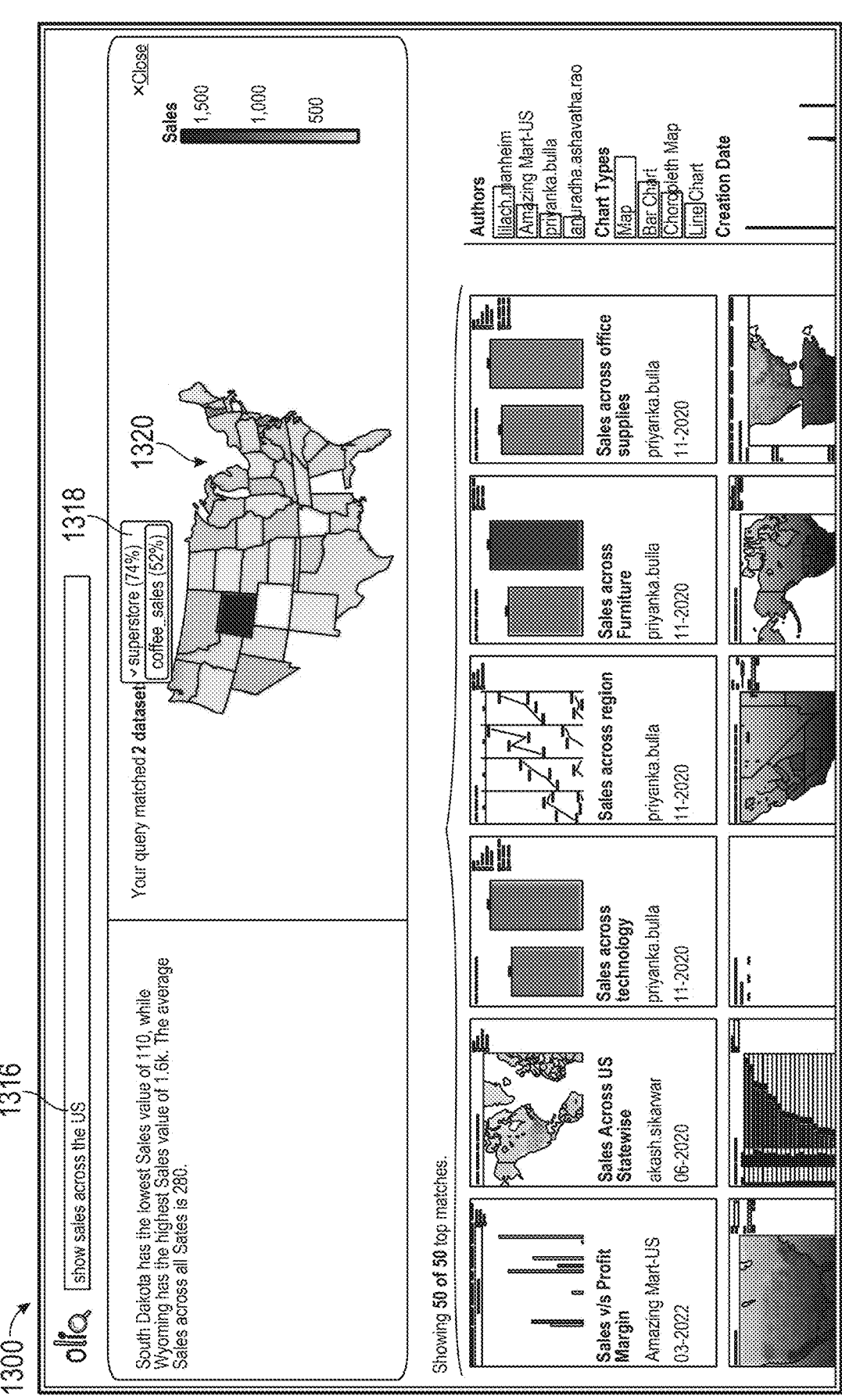
FIG. 13C shows another view of the example search interface shown in FIG. 13A after a user enters a search query, according to some implementations.

FIG. 13C shows another view of the example search interface 1300 after a user enters a search query 1316 ("show sales across the US"), according to some implementations. Similar to the preview described above in reference to FIG. 4A for the previous query, the system finds a relevant data source about superstore sales and generates a map 1320 since the query includes a geographic intent ("across the US"). The example also shows that the system indicates that there is another sales data source 1318 relevant to the query, allowing users to switch between the two.

Figure 13D:
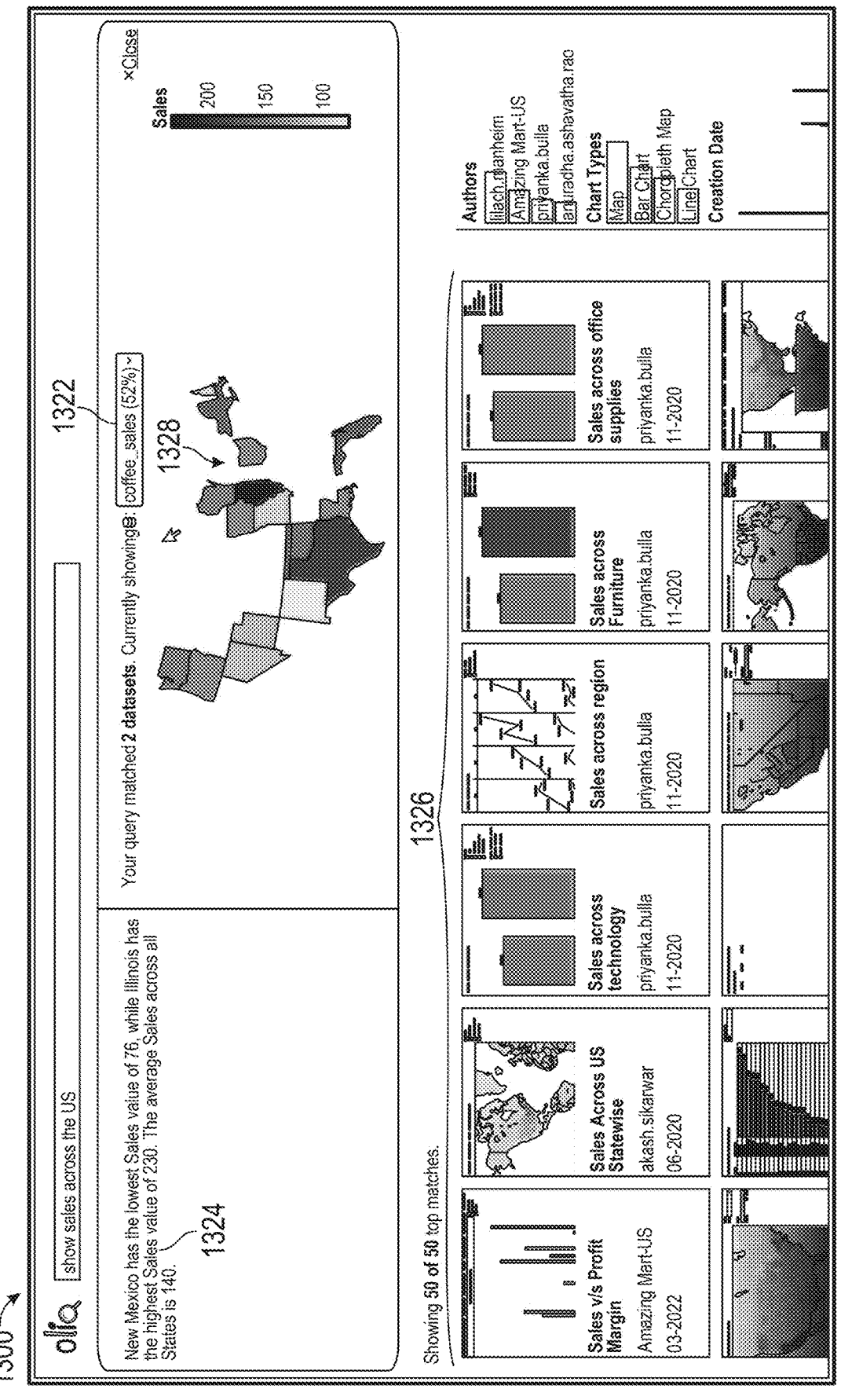
FIG. 13D shows another view of the example search interface shown in FIG. 13A after a user selects a different data set, according to some implementations.

FIG. 13D shows another view of the example search interface 1300 after a user selects a different data set 1322 (sometimes referred to as data source), according to some implementations. Similar to the preview described above in reference to FIG. 13C for the same query, the system generates a map 1328 since the query includes a geographic intent ("across the US"), a text summary 1324 describing key takeaways from the chart, as well as a set of pre-authored visualizations 1326.

Figure 13E:
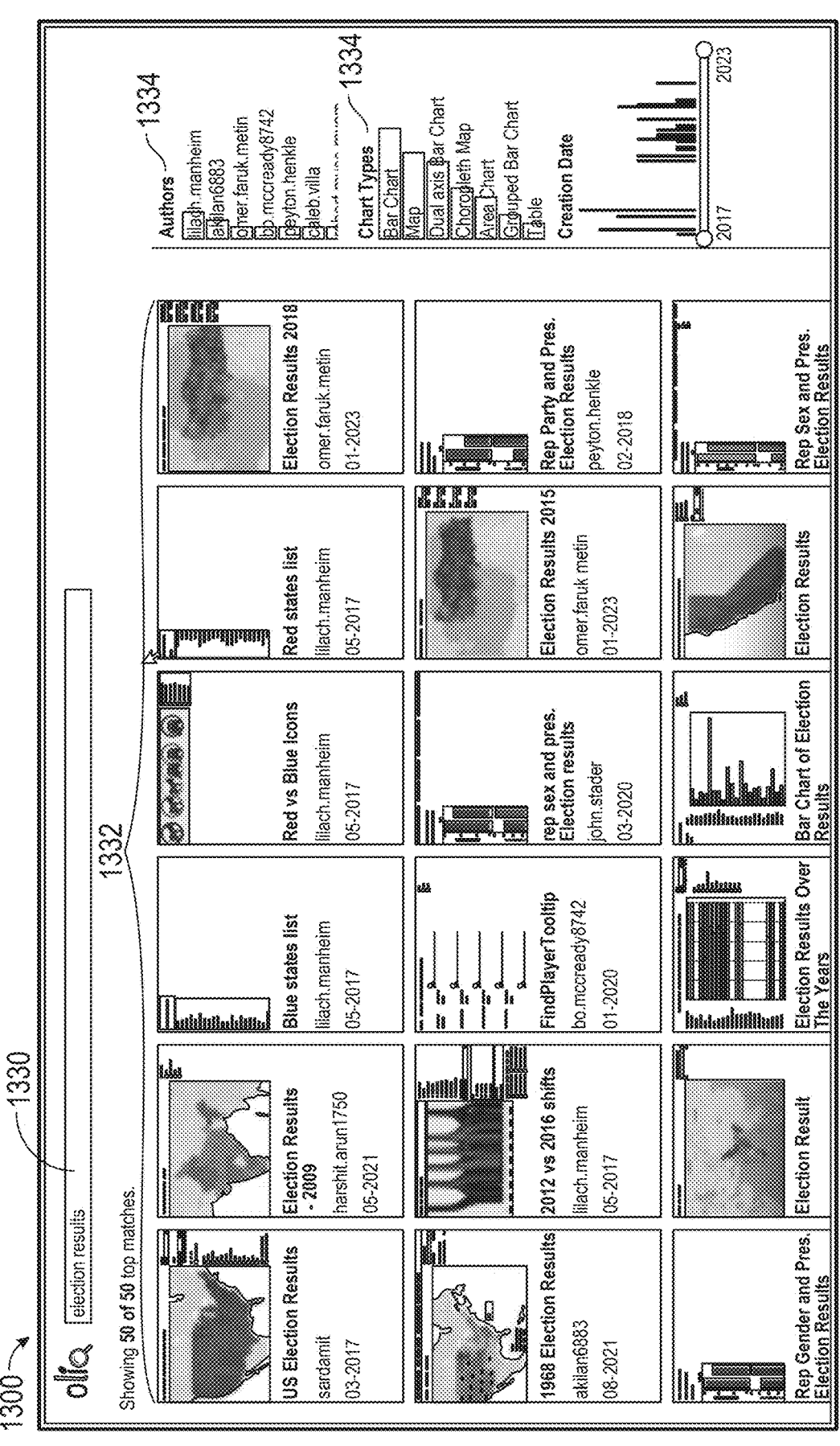
FIG. 13E shows another view of the example search interface shown in FIG. 13A after a user inputs a query ("election results"), according to some implementations.

FIG. 13E shows another view of the example search interface 1300 after a user inputs a query 1330 ("election results"). In the case of exploratory searches like election results where the input query is too vague or the system is unable to match the query to a data source, the system may not generate a visualization. The system displays only pre-authored visualizations 1332 allowing users to leverage the filters 1334 to explore the content.

Figure 14A:
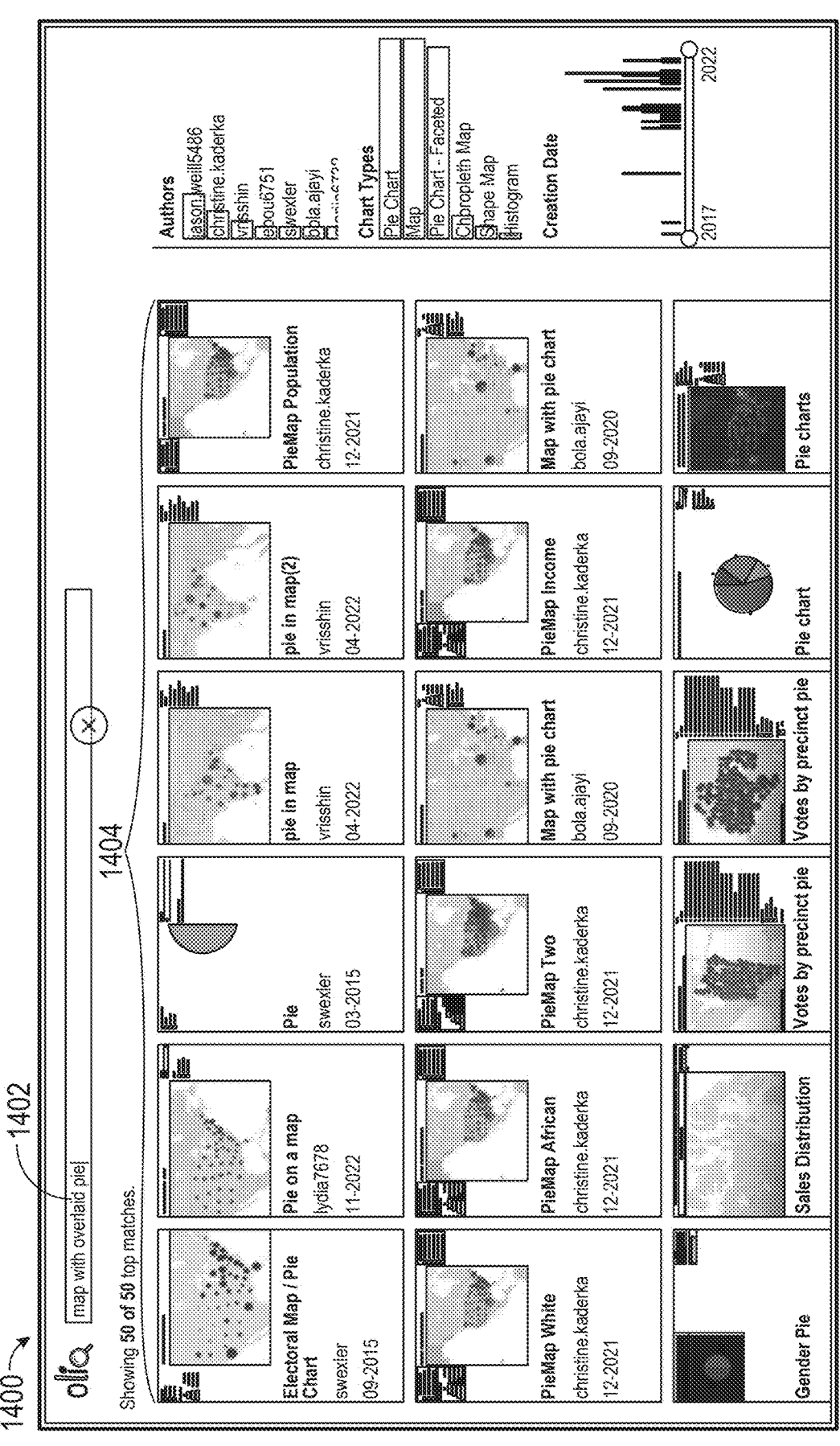
FIG. 14A shows an example search interface according to some implementations.
Figure 14B:
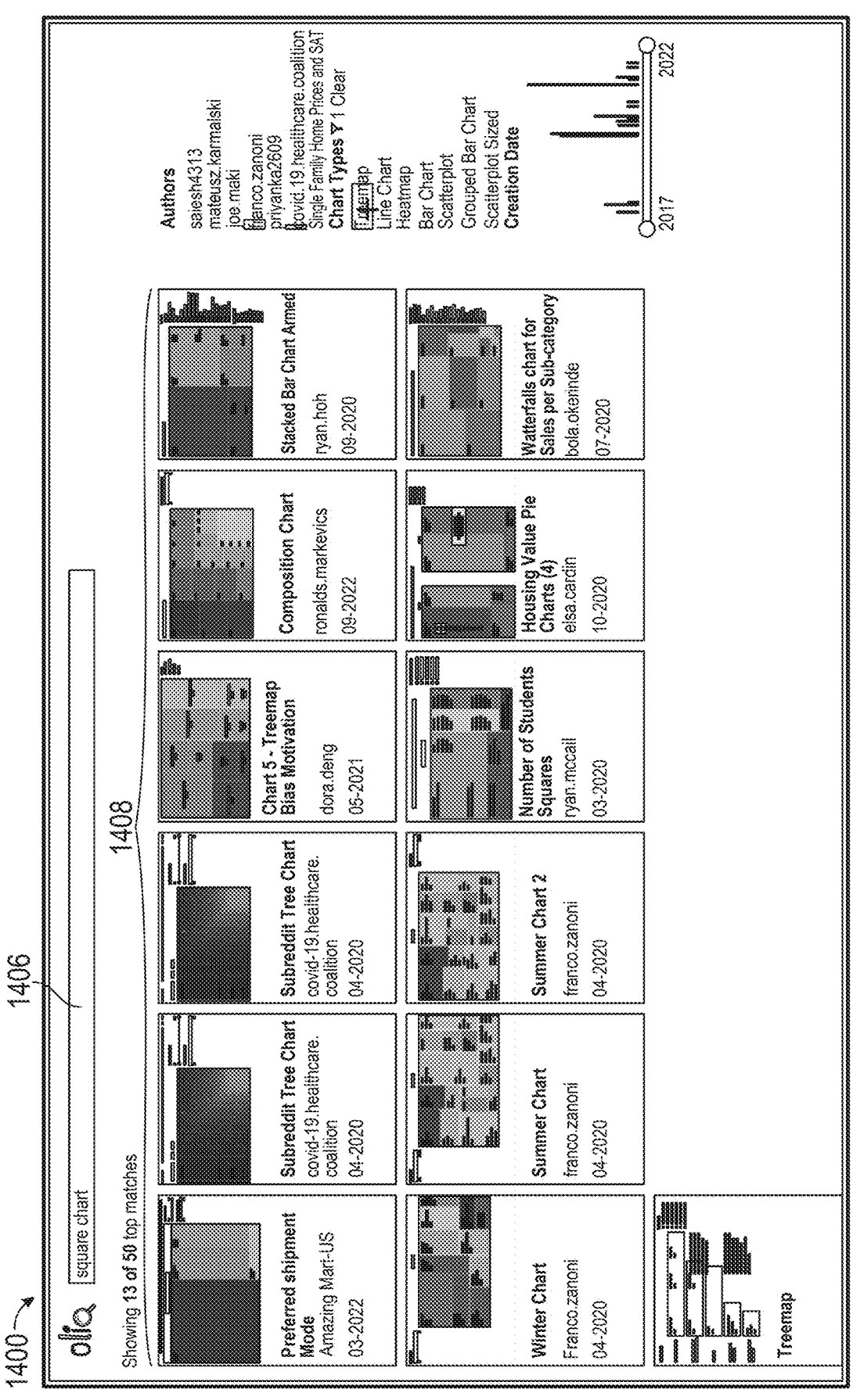
FIG. 14B shows another view of the example search interface shown in FIG. 14A, according to some implementations.

In some implementations, as users start typing, the system automatically populates the user interface with suitable pre-authored visualizations. FIG. 14A shows an example search interface 1400 according to some implementations. Even as the user starts typing the query 1402 ("map with overlaid pie"), the system starts populating the pre-authored visualization area 1404 with maps and pie charts. FIG. 14B shows another view of the example search interface 1400 according to some implementations. In this example, the user types the query 1406 ("square chart"), the system starts populating the pre-authored visualization area 1408 with charts that have squares (or rectangles). In this way, besides helping users answer questions or broadly explore topics, some implementations also allow users to search for specific visualization types by including graphical metadata properties (e.g., squares) of the visualizations as part of its search engine index. Coupled with the filtering options, the interface provides users the ability to search for visualizations in more expressive ways by explicitly specifying a chart type to look for combining different visualization types or even specifying lower level graphical properties such as shapes composing the visualization.

Figure 15:
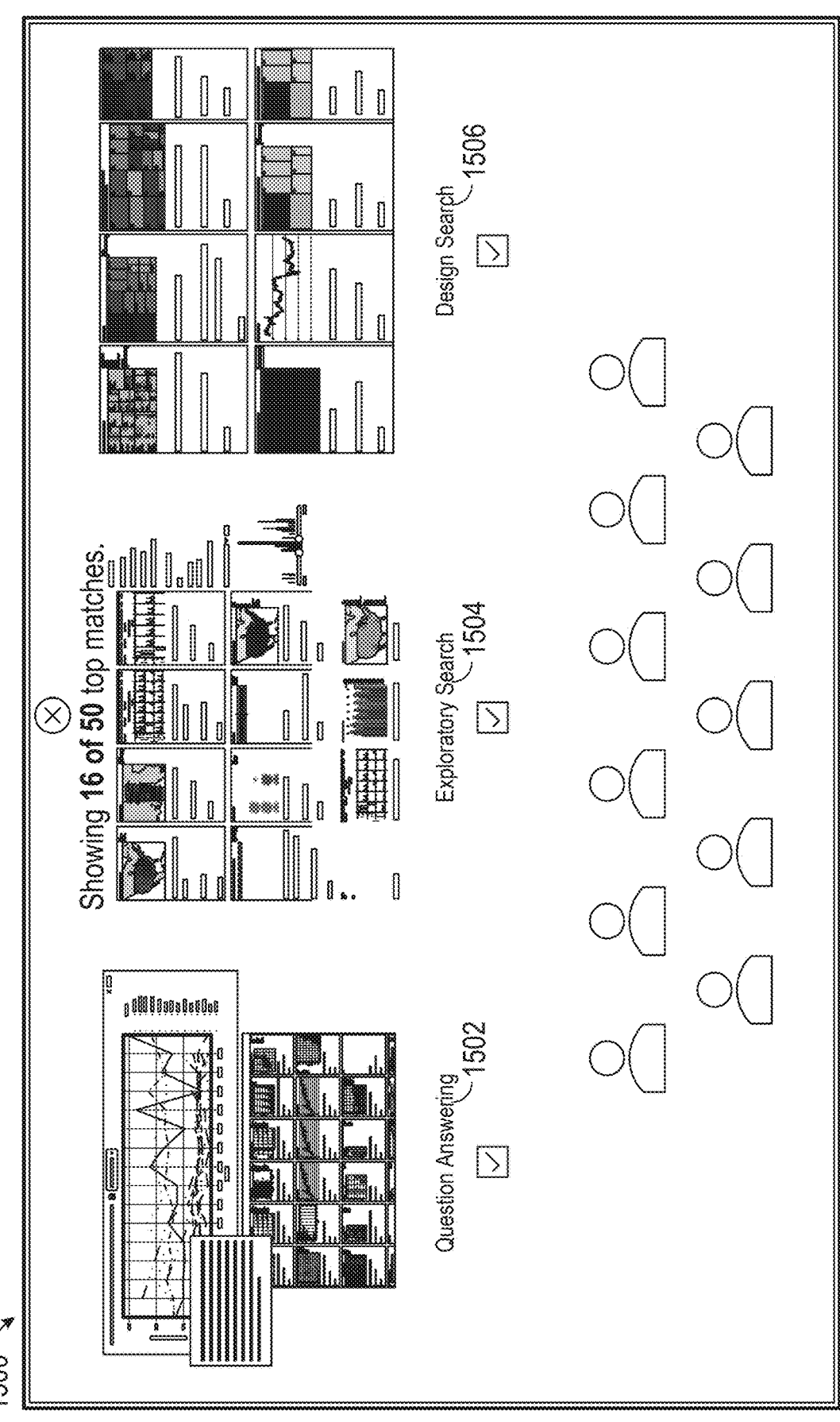
FIG. 15 shows example user interfaces for question answering, exploratory search, and design search, according to some implementations.

FIG. 15 shows example user interfaces 1500 for question answering 1502, exploratory search 1504, and design search 1506, according to some implementations. In this way, the example semantic search techniques described herein not only support different data repositories' search goals, but also facilitate a fluid, analytical search experience.

Example Computing Device for Visual Analysis of Datasets

FIG. 16 is a block diagram illustrating a computing device 1600, which can display the graphical user interfaces and support visual analysis of datasets, in accordance with some implementations. Various examples of the computing device 1600 include a desktop computer, a laptop computer, a tablet computer, and other computing devices that have a display and a processor capable of running a data visualization application 1630. The computing device 1600 typically includes one or more processing units (processors or cores) 1602, one or more network or other communications interfaces 1604, memory 1606, and one or more communication buses 1608 for interconnecting these components. The communication buses 1608 optionally include circuitry (sometimes called a chipset) that interconnects and controls communications between system components. The computing device 1600 includes a user interface 1610. The user interface 1610 typically includes a display device 1612. In some implementations, the computing device 1600 includes input devices such as a keyboard, mouse, and/or other input buttons 1616. Alternatively or in addition, in some implementations, the display device 1612 includes a touch-sensitive surface 1614, in which case the display device 1612 is a touch-sensitive display. In some implementations, the touch-sensitive surface 1614 is configured to detect various swipe gestures (e.g., continuous gestures in vertical and/or horizontal directions) and/or other gestures (e.g., single/ double tap). In computing devices that have a touch-sensitive display 1614, a physical keyboard is optional (e.g., a soft keyboard may be displayed when keyboard entry is needed). In some implementations, the user interface 1610 also includes an audio output device 1618, such as speakers or an audio output connection connected to speakers, earphones, or headphones. Furthermore, some computing devices 1600 use a microphone and voice recognition to supplement or replace the keyboard. In some implementations, the computing device 1600 includes an audio input device 1620 (e.g., a microphone) to capture audio (e.g., speech from a user).

The memory 1606 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 1606 includes one or more storage devices remotely located from the processor(s)

1602. The memory 1606, or alternatively the non-volatile memory device(s) within the memory 1606, includes a non-transitory computer-readable storage medium. In some implementations, the memory 1606 or the computer-readable storage medium of the memory 1606 stores the following programs, modules, and data structures, or a subset or superset thereof:

an operating system 1622, which includes procedures for handling various basic system services and for performing hardware dependent tasks;

a communications module 1624, which is used for connecting the computing device 1600 to other computers and devices via the one or more communication network interfaces 1604 (wired or wireless), such as the Internet, other wide area networks, local area networks, metropolitan area networks, and so on;

an optional web browser 1626 (or other application capable of displaying web pages), which enables a user to communicate over a network with remote computers or devices;

an optional audio input module 1628 (e.g., a microphone module) for processing audio captured by the audio input device 1620. The captured audio may be sent to a remote server and/or processed by an application executing on the computing device 1600 (e.g., the data visualization application 1630);

a data visualization application 1630, which generates data visualizations and related features. The application 1630 includes a graphical user interface 1632 (e.g., the graphical user interface 100 illustrated in FIG. 1) for a user to construct visual graphics. For example, a user selects one or more data sources 1640 (which may be stored on the computing device 1600 or stored remotely), selects data fields from the data source(s), and uses the selected fields to define a visual graphic; and one or more databases or data sources 1640 (e.g., a first data source 1640-1 and a second data source 1640-2), which are used by the data visualization application 1630. In some implementations, the data sources are stored as spreadsheet files, CSV files, text files, JSON files, XML files, or flat files, or stored in a relational database. Examples of data sources (sometimes referred to as curated data sources) are described above in reference to FIGS. 1A-1C, 2-1, 2-2, 4 and 6.

In some implementations, the data visualization application 1630 includes a data visualization generation module 1634, which takes user input (e.g., a visual specification 1636), and generates a corresponding visual graphic. The data visualization application 1630 then displays the generated visual graphic in the user interface 1632. In some implementations, the data visualization application 1630 executes as a standalone application (e.g., a desktop application). In some implementations, the data visualization application 1630 executes within the web browser 1626 or another application using web pages provided by a web server (e.g., a server-based application).

In some implementations, the information the user provides (e.g., user input) is stored as a visual specification 1636. In some implementations, the visual specification 1636 includes previous natural language commands received from a user or properties specified by the user through natural language commands.

In some implementations, the data visualization application 1630 includes a language processing module 1638 for processing (e.g., interpreting) commands provided by a user of the computing device. In some implementations, the commands are natural language commands (e.g., captured by the audio input device 1620). In some implementations, the language processing module 1638 includes sub-modules, such as a parser 1642 (e.g., the parser 404), a query classifier 1644 (e.g., the query classifier 402), a Q&A module 1646 (e.g., the Q&A module 408), a general search module 1648 (e.g., the general search module 410), and/or a semantic search module 1650 (e.g., the semantic search framework 406), examples of which are described above in reference to FIGS. 4 and 6. The data visualization application 1630 also includes pre-authored visualizations and/or results 1652, examples of which are described above in reference to FIGS. 1, 2-1 and 2-2, according to some implementations.

In some implementations, the memory 1606 stores intermediate data (e.g., query tokens, query vectors, intent, attributes, values, Levenshtein distance, syntactic and/or semantic similarities identified using Wu-Palmer similarity score, metrics, and/or scores) determined or calculated by the language processing module 1638. In some implementations, the memory 1606 stores Pearson's correlation coefficient, minimum/maximum and average values, and/or prompts for large language models. In addition, the memory 1606 may store thresholds and other criteria, which are compared against the metrics and/or scores determined by the language processing module 1638.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 16 shows a computing device 1600, FIG. 16 is intended more as a functional description of the various features that may be present rather than as a structural schematic of the implementations described herein. In practice, and as recognized by those of ordinary skill in the art, items shown separately could be combined and some items could be separated.

Example Methods for Visual Analysis of Datasets

FIG. 17 shows a flowchart of an example method 1700 for visual analysis of datasets, according to some implementations. The method is performed at a computing system 1600 having one or more processors 1602 and memory 1606 storing one or more programs configured for execution by the one or more processors.

The method includes receiving (1702) (e.g., by the query classifier 402) a natural language search query (e.g., the query 416) that is directed to a plurality of data repositories comprising a plurality of data sources 1640 and one or more data visualizations (e.g., the pre-authored visualizations 1652).

The method also includes parsing (1704) (e.g., by the parser 404) search tokens (e.g., the tokens 412) corresponding to the natural language search query to determine if the natural language search query contains one or more analytic intents (e.g., the intent 414). In some implementations, parsing the search tokens further includes identifying data attributes and values along with the one or more analytic intents based on the plurality of data sources and their metadata. In some implementations, identifying data attributes and values includes comparing N-grams correspond-
ing to the search tokens to available data attributes for
syntactic similarities and semantic similarities. In some
implementations, the syntactic similarities are identified
using Levenshtein distance and the semantic similarities are
identified using Wu-Palmer similarity scores.

The method also includes determining (1706) if the search
tokens match data fields (i.e., attributes) in one or more data
sources of the plurality of data sources, using a semantic
search (e.g., using the semantic search framework 406). In
some implementations, the method further includes obtain-
ing the search tokens using a federated query search that
distributes a query to multiple search repositories and com-
bines results into a single, consolidated search result. In
some implementations, the semantic search includes index-
ing each of the plurality of data repositories and their
metadata to obtain indices, and performing a federated
search to determine if the search tokens match fields in the
one or more data sources of the plurality of data sources,
based on the indices. In some implementations, the indexing
includes, for each data repository and visualization context
with associated metadata, representing each file as a respec-
tive document vector, and storing N-gram string tokens from
the document vectors to support partial and exact matches.
In some implementations, performing the federated search
includes obtaining a query vector corresponding to the
search tokens, encoding the query vector into query string
tokens using an encoder used to generate the indices, and
selecting a predetermined number of candidate document
vectors from the document vectors for each data repository
and visualization context with associated metadata, based on
the amount of overlap between the query string tokens and
document string tokens for the document vectors. In some
implementations, the method further includes ranking the
predetermined number of candidate document vectors using
a scoring function that scores documents based on the search
tokens appearing in each document, regardless of their
proximity within the document. In some implementations,
the method further includes, when the semantic search
returns a plurality of data sources, providing a drop-down
list of data source alternatives along with corresponding
percentage match scores for each data source. In some
implementations, the method further includes, when (i) the
semantic search returns a matching data source for the
natural language query and (ii) the search tokens do not
resolve to valid attributes and values within the data source,
displaying suggested queries for the data source. In some
implementations, the method further includes generating the
suggested queries using a template-based approach based on
a combination of attributes (i.e., data fields) from the data
source and data interestingness metrics. Examples of theses
operations are described above in reference to FIG. 6,
according to some implementations.

The method also includes, when (i) the search tokens
match fields in the one or more data sources and (ii) the
natural language search query contains one or more analytic
intents, generating and displaying (1708) (e.g., by the data
visualization generation module 1634) one or more visual-
ization responses. In some implementations, the one or more
analytic intents are one or more of: grouping, aggregation,
correlation, filter and limits, temporal, and geospatial. In
some implementations, the method further includes gener-
ating and displaying the one or more visualization responses
by interpreting the one or more analytic intents based on a
list of a predetermined number of data sources returned by
the semantic search. In some implementations, the method
further includes generating and displaying the one or more visualization responses based on attributes, values, and the
analytical intent in the natural language search query. In
some implementations, the method further includes gener-
ating and displaying the one or more visualization responses
using three encoding channels (x, y, and color) and four
mark types (bar, line, point, and geo-shape), thereby sup-
porting dynamic generation of bar charts, line charts, scat-
terplots, and maps that cover a range of analytic intents. In
some implementations, the method further includes deter-
mining mark types of the one or more visualization
responses based on mappings between visual encodings and
attribute data types.

In some implementations, the method further includes
generating and displaying (e.g., by the language processing
module 1638) a dynamic text summary 108 describing the
one or more visualization responses using one or more
statistical computations and a large language model. In some
implementations, the method further includes providing, to
the large language model, a prompt containing a statistical
description that is extracted from the generated visualization
using a predefined set of heuristics. In response to providing
the prompt, the method receives the dynamic text summary
from the large language model. In some implementations,
the predefined set of heuristics is selected according to the
type of the generated visualization. In some implementa-
tions, the prompt corresponds to (i) minimum/maximum and
average values for a bar chart, and (ii) the Pearson's corre-
lation coefficient for scatterplots.

The method also includes, when (i) the search tokens does
not match fields in the plurality of data sources or (ii) the
natural language search query does not contain the one or
more analytic intents, displaying (1710) (e.g., displaying by
the data visualization generation module 1634) one or more
pre-authored visualizations (e.g., the visualizations 116 in
FIG. 1B, and the pre-authored visualizations 1652) from the
one or more data visualizations.

FIG. 18 shows a flowchart of another example method
1800 for visual analysis of datasets, according to some
implementations. The method is performed at a computing
system 1600 having one or more processors 1602 and
memory 1606 storing one or more programs configured for
execution by the one or more processors.

The method includes receiving (1802) (e.g., by the data
visualization application 1630) user selection of a data
source (e.g., the data source 1640-1), presenting (1804) a
graphical user interface 1632 for analysis of data in the
selected data source, and providing (1806) three search
options. The search options include a question-and-answer
search (1808) for interpreting analytical intent over a set of
curated data sources, an exploratory search (1810) for docu-
ment-based information retrieval on indexed visualization
content, and a design search (1812) that uses visualization
metadata for the data source.

In some implementations, the method further includes
providing a facet-driven browser to prune search results by
author name, time range, and/or visualization type.

In some implementations, the method further includes
providing a landing screen 200, which displays a sampling
of data sources as thumbnail images, and in response to a
user hovering over a thumbnail image for a data source, the
method displays metadata information corresponding to the
data source.

In some implementations, the method further includes, in
response to a user typing a search query into an input text
box (e.g., after a user enters the query "world population" in
the text box 806 in FIG. 8): using tokens (e.g., the tokens 412
in FIG. 4) of the search query as keywords to match any pre-authored visualizations (e.g., the pre-authored results 422), and displaying a grid of thumbnails as a preview for browsing and exploration. Each thumbnail is hyperlinked to its corresponding visualization file that can be selected to peruse in more detail or downloaded. In some implementations, title, author name, and/or creation date of visualization are displayed below each thumbnail to provide additional context. In some implementations, the method further includes, in response to detecting a token in the search query that is a geographic location, generating a map as a response to the search query. In some implementations, the method further includes displaying scented widgets on a portion of an exploratory search panel to support faceted browsing of the pre-authored visualizations.

In some implementations, the method further includes augmenting data sources with metadata and semantics, prior to receiving a search query, including linking attributes and values in the data sources to ontological concepts, including synonyms and related terms. In some implementations, the metadata comprises data types and attribute semantics including identification of attributes that are measures and dimensions.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of visual analysis of datasets, comprising:
at a computing system having one or more processors and memory storing one or more programs configured for execution by the one or more processors:
receiving a natural language search query that is directed to a plurality of data repositories comprising a plurality of data sources and one or more data visualizations;
parsing search tokens corresponding to the natural language search query to determine if the natural language search query contains one or more analytic intents;
determining if the search tokens match data fields in one or more data sources of the plurality of data sources, using a semantic search, wherein the semantic search comprises:

indexing each of the plurality of data repositories and their metadata to obtain indices; and
performing a federated search to determine if the search tokens match fields in the one or more data sources of the plurality of data sources, based on the indices;
in accordance with a determination that (i) the search tokens match fields in the one or more data sources and (ii) the natural language search query contains one or more analytic intents, generating and displaying one or more visualization responses; and
in accordance with a determination that (i) the search tokens do not match fields in the plurality of data sources or (ii) the natural language search query does not contain the one or more analytic intents, displaying pre-authored content from the one or more data visualizations.

2. The method of claim 1, further comprising:
obtaining the search tokens using a federated query search that distributes a query to multiple search repositories and combines results into a single, consolidated search result.

3. The method of claim 1, wherein the one or more analytic intents is selected from the group consisting of: grouping, aggregation, correlation, filter and limits, temporal, and geospatial.

4. The method of claim 1, wherein parsing the search tokens further comprises identifying data fields and data values along with the one or more analytic intents based on the plurality of data sources and their metadata.

5. The method of claim 4, wherein identifying data fields and data values comprises comparing N-grams corresponding to the search tokens to available data fields for syntactic similarities and semantic similarities.

6. The method of claim 5, wherein the syntactic similarities are identified using Levenshtein distance and the semantic similarities are identified using Wu-Palmer similarity scores.

7. The method of claim 1, wherein the indexing comprises:
for each data repository and visualization context with associated metadata, representing each file as a respective document vector; and
storing N-gram string tokens from the document vectors to support partial and exact matches.

8. The method of claim 1, wherein performing the federated search comprises:
obtaining a query vector corresponding to the search tokens;
encoding the query vector into query string tokens using an encoder that was used to generate the indices; and
selecting a predetermined number of candidate document vectors from document vectors for each data repository and visualization context with associated metadata, based on an amount of overlap between the query string tokens and document string tokens for the document vectors.

9. The method of claim 8, further comprising:
ranking the predetermined number of candidate document vectors using a scoring function that scores documents based on the search tokens appearing in each document, regardless of their proximity within the document.

10. The method of claim 1, further comprising:

generating and displaying the one or more visualization responses based on data fields, data values, and the one or more analytical intents in the natural language search query.

11. The method of claim 1, further comprising:

in accordance with a determination that (i) the semantic search returns a matching data source for the natural language query and (ii) the search tokens do not resolve to valid data fields and data values within the data source, displaying suggested queries for the data source.

12. The method of claim 11, further comprising:

generating the suggested queries using a template-based approach based on a combination of data fields from the data source and data interestingness metrics.

13. The method of claim 1, further comprising:

generating and displaying the one or more visualization responses using three encoding channels (x, y, and color) and four mark types (bar, line, point, and geo-shape), thereby supporting dynamic generation of bar charts, line charts, scatterplots, and maps that cover a range of analytic intents.

14. The method of claim 1, further comprising:

determining mark types of the one or more visualization responses based on mappings between visual encodings and data types of data fields.

15. The method of claim 1, further comprising:

generating and displaying a dynamic text summary describing the one or more visualization responses using one or more statistical computations and a large language model;

providing, to the large language model, a prompt containing a statistical description that is extracted from the one or more visualization responses using a pre-defined set of heuristics; and in response to providing the prompt, receiving the dynamic text summary from the large language model.

16. The method of claim 15, wherein the prompt corresponds to (i) minimum/maximum and average values for a bar chart, and (ii) the Pearson's correlation coefficient for scatterplots.

17. The method of claim 1, further comprising before receiving the natural language search query:

receiving user selection of a data source;

presenting a graphical user interface for analysis of data in the selected data source; and providing three search options including:

(i) a question-and-answer search for interpreting analytical intent withing the selected data source;

(ii) an exploratory search for document-based information retrieval of indexed visualization content for the selected data source; and (iii) a design search that uses visualization metadata for the selected data source.

18. A computer system for visual analysis of datasets, comprising:

one or more processors; and memory;

wherein the memory stores one or more programs configured for execution by the one or more processors, and the one or more programs comprising instructions for:

receiving a natural language search query that is directed to a plurality of data repositories comprising a plurality of data sources and one or more data visualizations;

parsing search tokens corresponding to the natural language search query to determine if the natural language search query contains one or more analytic intents;

determining if the search tokens match data fields in one or more data sources of the plurality of data sources, using a semantic search, wherein the semantic search comprises:

indexing each of the plurality of data repositories and their metadata to obtain indices; and performing a federated search to determine if the search tokens match fields in the one or more data sources of the plurality of data sources, based on the indices;

in accordance with a determination that (i) the search tokens match fields in the one or more data sources and (ii) the natural language search query contains one or more analytic intents, generating and displaying one or more visualization responses; and in accordance with a determination that (i) the search tokens does not match fields in the plurality of data sources or (ii) the natural language search query does not contain the one or more analytic intents, displaying pre-authored content from the one or more data visualizations.

19. A non-transitory computer readable storage medium storing one or more programs configured for execution by a computer system having one or more processors, and memory, the one or more programs comprising instructions for:

receiving a natural language search query that is directed to a plurality of data repositories comprising a plurality of data sources and one or more data visualizations;

parsing search tokens corresponding to the natural language search query to determine if the natural language search query contains one or more analytic intents;

determining if the search tokens match data fields in one or more data sources of the plurality of data sources, using a semantic search, wherein the semantic search comprises:

indexing each of the plurality of data repositories and their metadata to obtain indices; and performing a federated search to determine if the search tokens match fields in the one or more data sources of the plurality of data sources, based on the indices;

in accordance with a determination that (i) the search tokens match fields in the one or more data sources and (ii) the natural language search query contains one or more analytic intents, generating and displaying one or more visualization responses; and in accordance with a determination that (i) the search tokens does not match fields in the plurality of data sources or (ii) the natural language search query does not contain the one or more analytic intents, displaying pre-authored content from the one or more data visualizations.

* * * * *